(12) United States Patent
Conde et al.

(10) Patent No.: US 10,740,448 B2
(45) Date of Patent: Aug. 11, 2020

(54) VERIFICATION REQUEST AUTHENTICATION MACHINE

(71) Applicant: Callsign Inc., London (GB)

(72) Inventors: Gabriel Domínguez Conde, London (GB); Yogesh Kumar Jitendra Patel, London (GB); Peter Alexander Foster, London (GB)

(73) Assignee: Callsign Inc., London (GB)

( * ) Notice: Subject to any disclaimer, the term of this patent is extended or adjusted under 35 U.S.C. 154(b) by 221 days.

(21) Appl. No.: 16/019,321

(22) Filed: Jun. 26, 2018

(65) Prior Publication Data
US 2019/0392128 A1    Dec. 26, 2019

(51) Int. Cl.
  *G06F 21/32*   (2013.01)
  *G06K 9/00*    (2006.01)
  *G06N 3/08*    (2006.01)

(52) U.S. Cl.
  CPC ......... *G06F 21/32* (2013.01); *G06K 9/00288* (2013.01); *G06N 3/08* (2013.01)

(58) Field of Classification Search
  CPC .. G06F 21/32; G06F 2221/2111; G06F 21/35; G06F 21/31; G06K 9/00288; G06N 3/08
  USPC ......................................................... 726/19
  See application file for complete search history.

(56) References Cited

U.S. PATENT DOCUMENTS

| | | | | |
|---|---|---|---|---|
| 6,963,659 B2 * | 11/2005 | Tumey | ............... | G06K 9/00087 340/5.2 |
| 8,254,647 B1 * | 8/2012 | Nechyba | ............ | G06K 9/00248 382/118 |
| 9,202,105 B1 * | 12/2015 | Wang | ................. | G06Q 20/4014 |
| 2013/0201359 A1 * | 8/2013 | Wu | ..................... | H04N 5/23219 348/222.1 |
| 2014/0181910 A1 * | 6/2014 | Fingal | .................. | H04L 63/105 726/4 |

(Continued)

FOREIGN PATENT DOCUMENTS

| GB | 2575730 A | 1/2020 |
|---|---|---|
| WO | WO-2018027148 A1 | 2/2018 |

OTHER PUBLICATIONS

Chen, MO, et al., "Determining Image Origin and Integrity Using Sensor Noise", IEEE Transactions on Information Forensics and Security, 3(1), (Mar. 2008), 74-90.

(Continued)

*Primary Examiner* — Kambiz Zand
*Assistant Examiner* — Aubrey H Wyszynski
(74) *Attorney, Agent, or Firm* — Schwegman Lundberg & Woessner, P.A.

(57) ABSTRACT

A device authenticates a request to user. The device accesses a face image that depicts a face of the person and includes a characteristic noise pattern inserted by a camera of the device. The device also accesses a geolocation which the device captured the face image and puts the face image and the geolocation into an artificial intelligence engine that outputs a face score, device score, and a location score. The device next submits the request with the scores to a server machine and obtains an authentication score from the server machine. The device then presents an indication that the request to verify the person is authentic based on a comparison of the obtained authentication score to a threshold authentication score.

20 Claims, 15 Drawing Sheets

(56) References Cited

U.S. PATENT DOCUMENTS

2016/0234023 A1    8/2016    Mozer et al.
2017/0068842 A1*    3/2017    Garcia ............... G06K 9/00288
2019/0392122 A1    12/2019    Foster et al.

OTHER PUBLICATIONS

Goljan, Miroslav, et al., "Effect on Compression on Sensor-Fingerprint Based Camera Identification", IS&T International Symposium on Electronic Imaging (EI 2016), San Francisco, CA, Feb. 14-18, 2016, (2016), 10 pgs.

Lawgaly, Ashref, et al., "Sensor Pattern Noise Estimation Based on Improved Locally Adaptive DCT Filtering and Weighted Averaging for Source Camera Identification and Verification", IEEE Transactions on Information Forensics and Security, 12(2), (Feb. 2017), 392-404.

Lin, Miao, et al., "Mobile User Verification/Identification using Statistical Mobility Profile", 2015 International Conference on Big Data and Smart Computing (BIGCOMP), (2015), 15-18.

Parkhi, Omkar M., et al,, "Deep Face Recognition", Extended Abstract, Proceedings of the British Machine Vision Conference (BMVC), (2015), p. 45.

Schroff, Florian, et al., "FaceNet: A Unified Embedding for Face Recognition and Clustering", 2015 IEEE Conference on Computer Vision and Pattern Recognition (CVPR), (2015), 815-823.

Taigman, Yaniv, et al., "Deepface Closing the Gap to Human-Level Performance in Face Verification", In Proceedings of the IEEE Conference on Computer Vision and Pattern Recognition, (2014), 1701-1708.

"United Kingdom Application Serial No. 1908638.8, Search Report dated Nov. 18, 2019", 4 pgs.

U.S. Appl. No. 16/019,358, filed Jun. 26, 2018, Verification Request Authentication Machine.

* cited by examiner

VERIFICATION REQUEST AUTHENTICATION MACHINE

TECHNICAL FIELD

The subject matter disclosed herein generally relates to the technical field of special-purpose machines that facilitate controlling user access to one or more machines (e.g., computers) or networks thereof, including software-configured computerized variants of such special-purpose machines and improvements to such variants, and to the technologies by which such special-purpose machines become improved compared to other special-purpose machines that facilitate control of user access to one or more machines or networks thereof. Specifically, the present disclosure addresses systems and methods to facilitate authentication of a request to verify a user.

BACKGROUND

A machine may be configured to interact with a user by verifying that the user is permitted to access something, such as the machine itself, a feature thereof, or a software application thereon, and then granting such permission or notifying the user that such permission has been granted. For example, the machine may present a login interface in the form of a graphical user interface configured to accept login credentials (e.g., a username and a password) entered by a user, submit the login credentials for local or remote verification, receive results of that verification, and present an indication of whether the login credentials are sufficient to grant the user access to something (e.g., a feature, an application, or some data) that corresponds to the login interface.

As used herein, "verification" of a user refers to a determination that the user is indeed who he or she purports to be, which elsewhere could be described as identifying the user, authenticating the user, or logging-in the user. In situations where a first machine uses a trusted second machine to verify the user, the first machine may send the user's login credentials in a request to verify the user, also called a "verification request" herein, to the trusted second machine. However, since some circumstances can be vulnerable to a falsified verification request (e.g., by someone attempting unauthorized access by submitting legitimate login credentials that belong to someone else), it can be helpful to authenticate the verification request itself (e.g., as a separate and independent operation from the verifying of the user). Accordingly, as used herein, "authentication" of a request for verification refers to a determination that the request is legitimate and not falsified.

BRIEF DESCRIPTION OF THE DRAWINGS

Some embodiments are illustrated by way of example and not limitation in the figures of the accompanying drawings.

DETAILED DESCRIPTION

Figure 1:
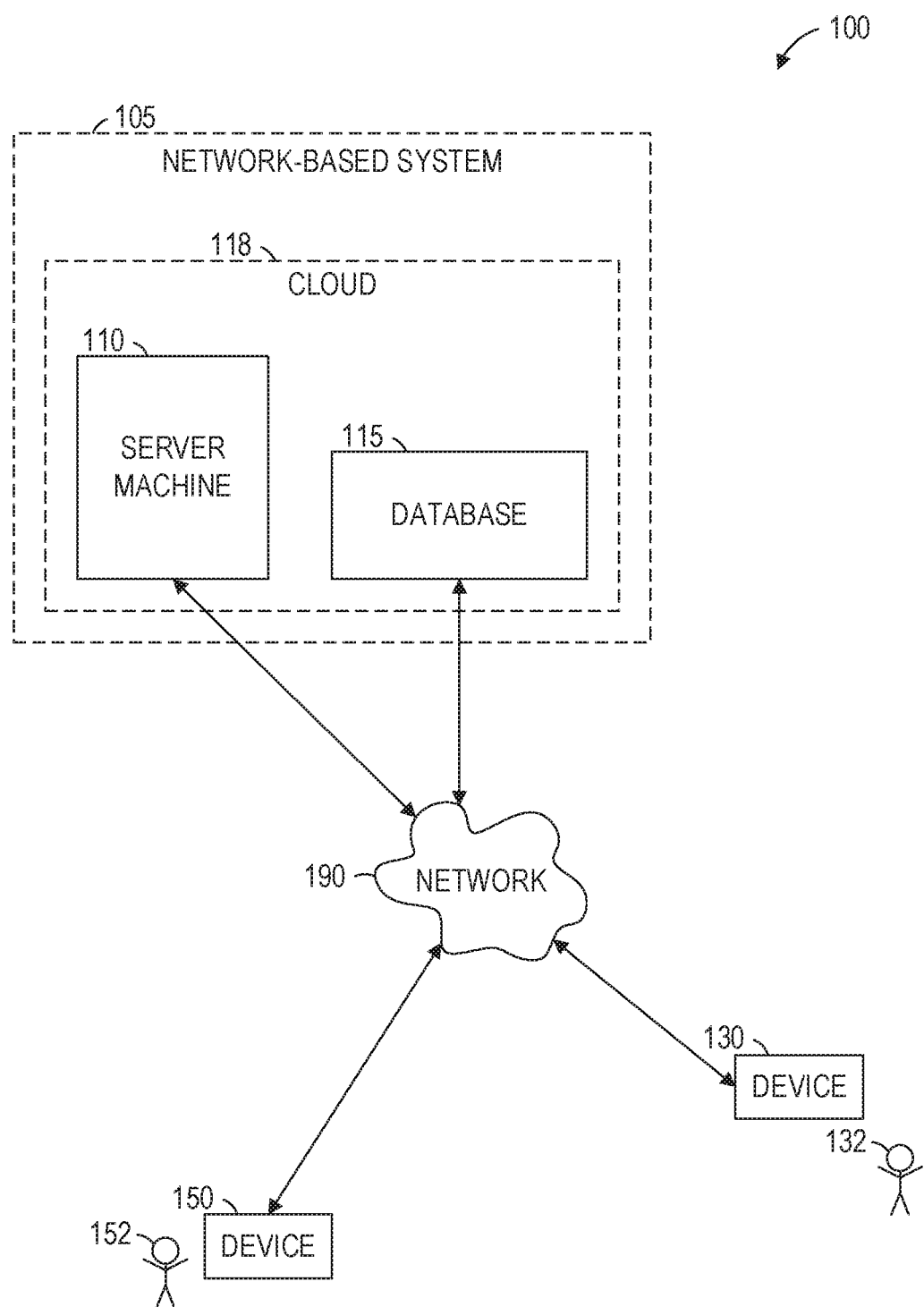
FIG. 1 is a network diagram illustrating a network environment suitable for authentication of a verification request, according to some example embodiments.

Example methods (e.g., algorithms) facilitate authentication of a request to verify a user, and example systems (e.g., special-purpose machines configured by special-purpose software) are configured to facilitate authentication of a request to verify a user. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine in the example form of a device is configured (e.g., by suitable software, hardware, or both) to perform authentication of a user verification request. Accordingly, the device may access (e.g., from its memory, local storage, or a remote database) a face image to be submitted in a request to verify a person, where the face image was captured by a camera of the device, depicts a face of the person, and includes a characteristic noise pattern inserted by the camera into images captured by the camera. The device also accesses geolocation data that represents a geolocation at which the device is located during capture of the face image. The device then inputs the face image and the geolocation data into an artificial intelligence engine that is trained to generate a face score based on the face image, generate a device score based on the characteristic noise pattern, and generate a location score based on the geolocation data, and the artificial intelligence engine indeed generates the face score, the device score, and the location score in response to the inputting. The device next obtains an authentication score from a server machine by providing the verification request with the face score, the device score, and the location score to the server machine via a communication network, and the server machine generates the authentication score based on the face score, the device score, and the location score in response to the providing. After obtaining the authentication score from the server machine, the device presents an indication that the request to verify the person is authentic based on a comparison of the obtained authentication score to a threshold authentication score.

Correspondingly, the server machine is configured (e.g., by suitable software, hardware, or both) to facilitate authentication of a user verification request. The server machine accesses a face score generated by a first artificial intelligence engine based on a face image submitted in a request to verify a person, where the face image was captured by a camera of a device, depicts a face of the person, and includes a characteristic noise pattern inserted by the camera into images captured by the camera. The server machine also accesses a device score generated by the first artificial intelligence engine based on the characteristic noise pattern in the face image. The server machine additionally accesses a location score generated by the first artificial intelligence engine based on geolocation data that specifies a geolocation at which the device is located during capture of the face image. The service then generates an authentication score by inputting the face score, the device score, and the location score into a second artificial intelligence engine and obtaining the authentication score output therefrom. After obtaining the authentication score, the server machine provides the authentication score to the device via a communication network, and the providing of authentication score causes the device to present an indication that the request to verify the person is authentic based on a comparison of the provided authentication score to a threshold authentication score.

In some example embodiments, the server machine is configured to prepare (e.g., train) an artificial intelligence engine (e.g., the first artificial intelligence engine, mentioned above, which may be or include a neural network). To do this, the server machine accesses a reference set of obfuscated geolocations that are generated from and correspond to actual geolocations from which a device submitted requests to verify a person. Details on the manner in which these geolocations have been obfuscated are provided below. The server machine then groups the obfuscated geolocations from the reference set into geographical clusters based on a predetermined cluster radius value. The server machine next determines (e.g., calculates) a corresponding representative geolocation for each geographical cluster among the geographical clusters and a corresponding variance distance from the representative geolocation for each geographical cluster among the geographical clusters. Accordingly, the server machine then generates a reference location score based on the representative geolocations of the geographical clusters and on the variance distances of the geographical clusters. After the reference location score is generated, the server machine trains an artificial intelligence engine to output that reference location score in response to the reference set of obfuscated geolocations being input thereto. The trained artificial intelligence engine may then be provided (e.g., in executable form) by the server machine to one or more devices for use thereon.

Correspondingly, in some example embodiments, the device is configured to utilize the prepared (e.g., trained) artificial intelligence engine. To do this, the device generates an obfuscated geolocation of the device by obfuscating an actual geolocation of the device. The device then inputs the obfuscated geolocation into an artificial intelligence engine that is trained to output a reference location score in response to a reference set of obfuscated geolocations being input thereto. As noted above, the reference set of obfuscated geolocations was generated from and corresponds to actual geolocations from which the device submitted requests to verify a person. Based on the inputting of the obfuscated geolocation, the artificial intelligence engine generates a candidate location score. The device obtains an authentication score from the server machine by providing the candidate location score to the server machine in a request to verify the person, and the server machine generates the authentication score based on the candidate location score in response to the providing. After the authentication score is obtained by the device from the server machine, the device presents an indication that the request to verify the person is authentic based on a comparison of the obtained authentication score to a threshold authentication score. Further details are discussed below.

FIG. 1 is a network diagram illustrating a network environment 100 suitable for performing authentication of a verification request, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services, such as verification request authentication services, to the devices 130 and 150). The server machine 110 and the devices 130 and 150 may each be implemented in a special-purpose (e.g., specialized) computer system, in whole or in part, as described below with respect to FIG. 15.

Also shown in FIG. 1 are users 132 and 152, one or both of which may be a person (e.g., a human being). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 15, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to an intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
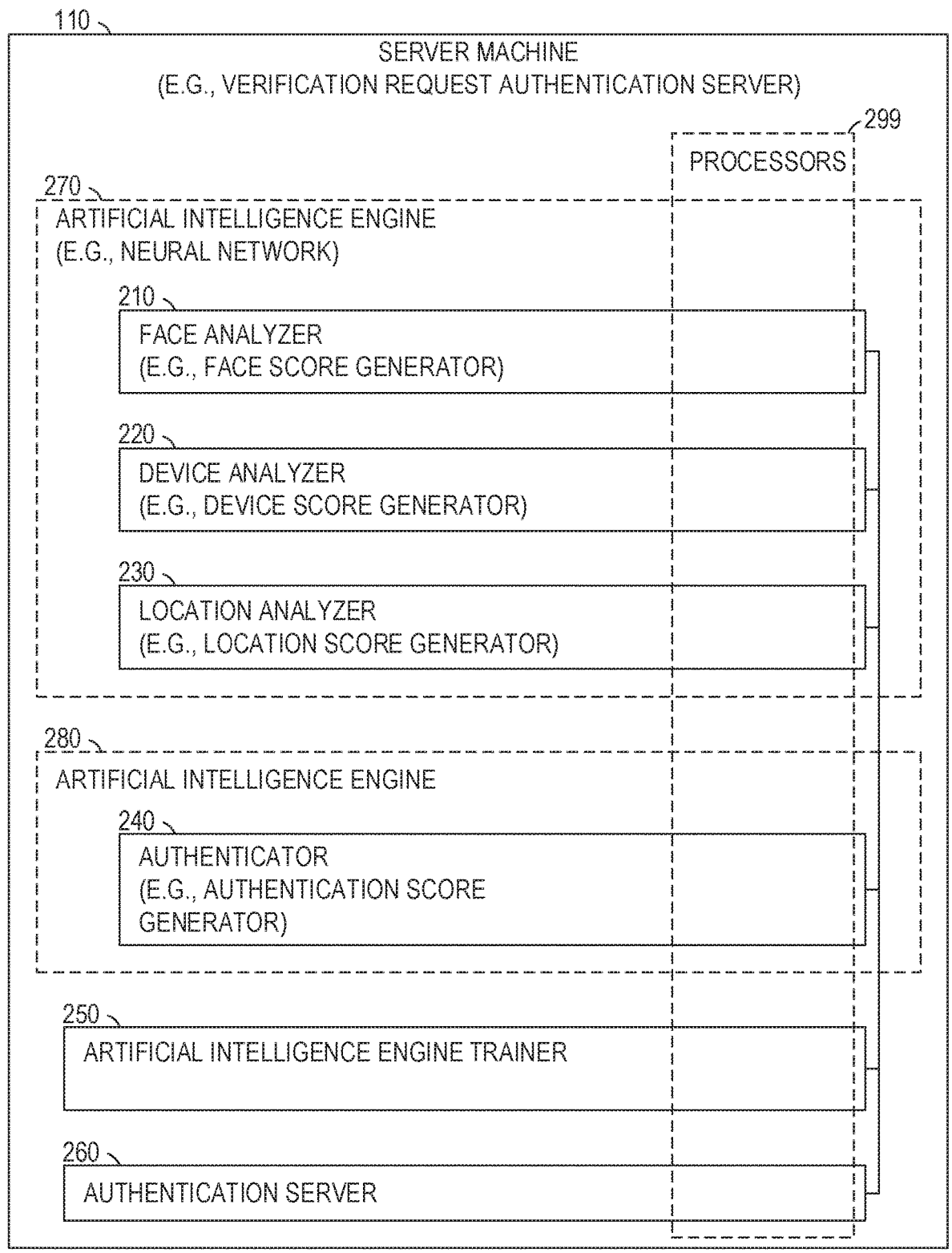
FIG. 2 is a block diagram illustrating components of a server machine, according to some example embodiments.

FIG. 2 is a block diagram illustrating components of the server machine 110, according to some example embodiments. The server machine 110 is shown as including a face analyzer 210, a device analyzer 220, a location analyzer 230, an authenticator 240, an artificial intelligence engine trainer 250, and authentication server 260, all configured to communicate with each other (e.g., via a bus, shared memory, or a switch).

The face analyzer 210 may be or include a face score generator or similarly suitable code to analyze a face image and generate a face score therefrom. The device analyzer 220 may be or include a device score generator or similarly suitable code to analyze device-specific information and generate a device score therefrom. The location analyzer 230 may be or include a location score generator or similarly suitable code to analyze location information (e.g., geolocation information) and generate a location score therefrom. The authenticator 240 may be or include an authentication score generator or similarly suitable code to generate an authentication score based on a face score, device score, a location score, or any suitable combination thereof.

As shown in FIG. 2, the face analyzer 210, the device analyzer 220, and the location analyzer 230 may form all or part of an artificial intelligence engine 270 (e.g., a neural network, such as a deep neural network, a deep beliefs neural network, a convolutional neural network, a recurrent neural network, or any suitable combination thereof, or another form of artificial intelligence, such as an artificially intelligent module based on signal processing, machine learning, deep learning, or any suitable combination thereof) that is stored (e.g., installed) on the server machine 110 and executable thereon. Similarly, the authenticator 240 may form all or part of another artificial intelligence engine 280 (e.g., a neural network, such as a deep neural network, a deep beliefs neural network, a convolutional neural network, a recurrent neural network, or any suitable combination thereof, or another form of artificial intelligence, such as an artificially intelligent module based on signal processing, machine learning, deep learning, or any suitable combination thereof) that is stored on the server machine 110 and executable thereon.

The artificial intelligence engine trainer 250 is configured to train one or more artificial intelligence engines (e.g., artificial intelligence engines 270 and 280). The authentication server 260 is configured to provide one or more network-based authentication services via the network 190 to one or more clients (e.g., devices 130 and 150). Furthermore, one or more processors 299 (e.g., hardware processors, digital processors, or any suitable combination thereof) may be included (e.g., temporarily or permanently) in the face analyzer 210, the device analyzer 220, the location analyzer 230, the authenticator 240, the artificial intelligence engine trainer 250, the authentication server 260, the artificial intelligence engine 270, the artificial intelligence engine 280, or any suitable combination thereof.

Figure 3:
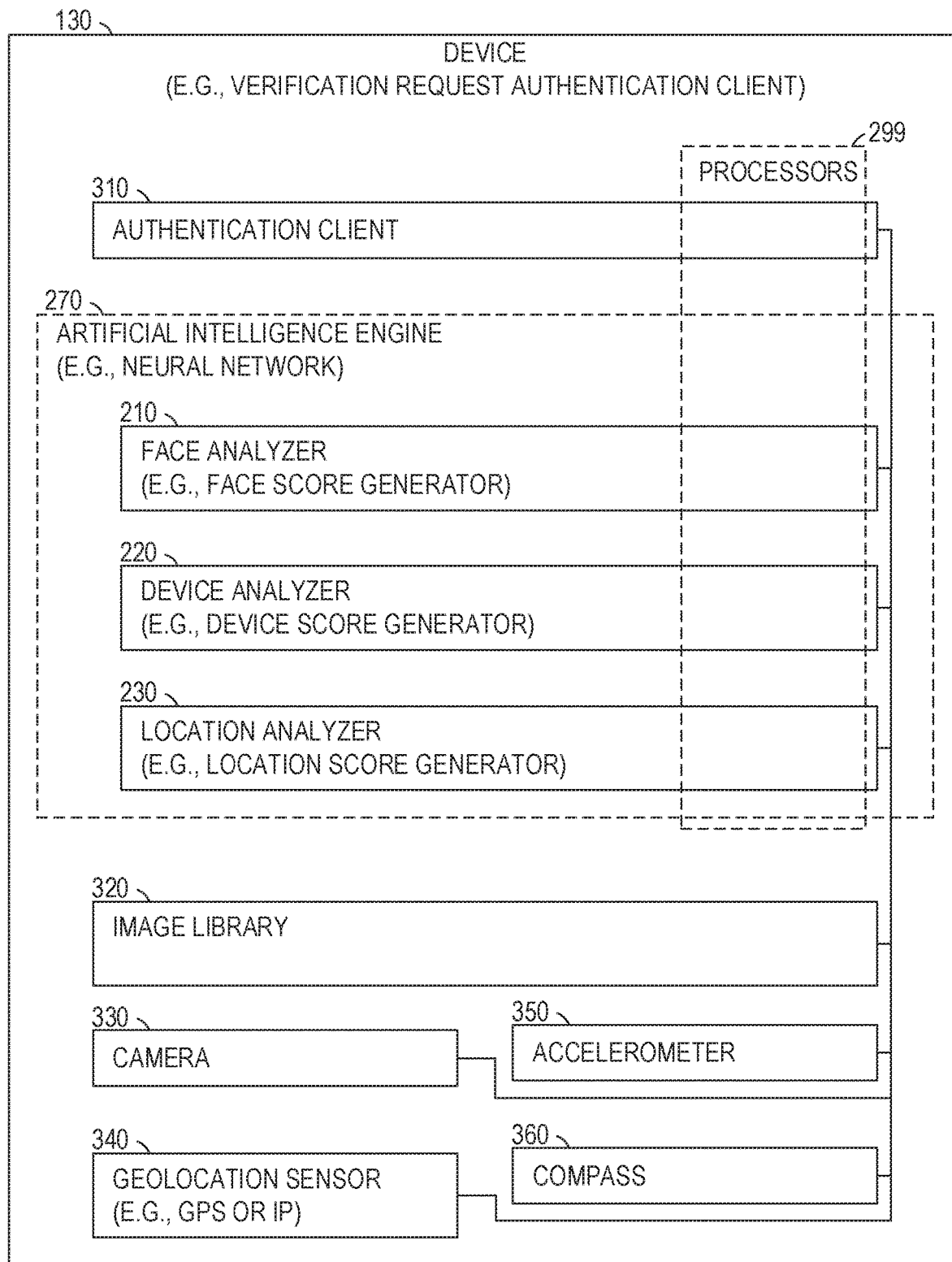
FIG. 3 is a block diagram illustrating components f a device, according to some example embodiments.

FIG. 3 is a block diagram illustrating components of the device 130, according to some example embodiments. The device 130 is shown as including an authentication client 310, an image library 320, a camera 330, a geolocation sensor 340, accelerometer 350, and a compass 360, all configured to communicate with each other (e.g., via a bus, shared memory, or a switch). In some example embodiments, the device 130 also includes the artificial intelligence engine 270 discussed above with respect to FIG. 2. For example, the artificial intelligence engine 270 may be provided to the device 130 via the network 190 (e.g., from the server machine 110).

As shown in FIG. 3, the authentication client 310 is configured to access and use one or more network-based authentication services via the network 190 from one or more servers (e.g., server machine 110). The image library 320 is a data repository that stores one or more images, such as face images that depict a face of a user (e.g., user 132). The camera 330 is configured to capture one or more images (e.g., face images). The geolocation sensor 340 is configured to generate geolocation data (e.g., global positioning system (GPS) coordinates, an Internet Protocol (IP) address, or any suitable combination thereof) that fully or partially indicates the geolocation of the device 130. The accelerometer 350 is configured to generate acceleration data that fully or partially indicates one or more corresponding movements made by the device 130. The compass 360 is configured to generate directional data that fully or partially indicates an orientation in which the device 130 is pointed. Furthermore, one or more processors 299 (e.g., hardware processors, digital processors, or any suitable combination thereof) may be included (e.g., temporarily or permanently) in the authentication client, the face analyzer 210, the device analyzer 220, the location analyzer 230, the artificial intelligence engine 270, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
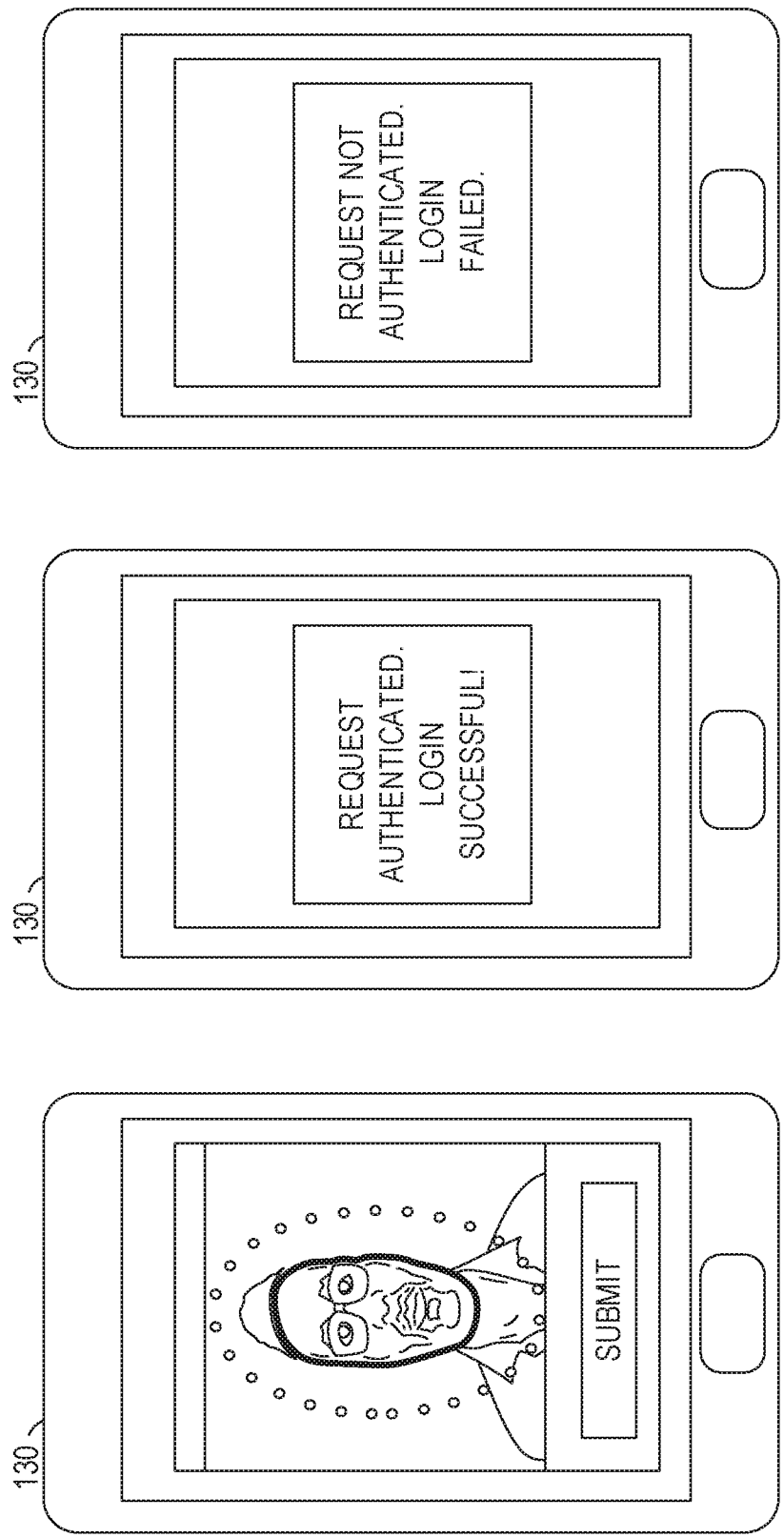
FIG. 4 is a diagram illustrating a graphical user interface presented by the device in authenticating a request to verify a user, according to some example embodiments.

FIG. 4 is a diagram illustrating a graphical user interface presented by the device 130 in authenticating a request to verify a user, according to some example embodiments. Three appearances of the graphical user interface are shown in FIG. 4. In the left appearance, a face image that depicts the face of a user (e.g., user 132) is captured by the device 130 (e.g., using the camera 330). A button marked "Submit" is operable, to submit a request for verification of the user based on the face image. For example, the face image may be a selfie of the user 132 (e.g., a self-taken image that depicts the face of the user 132), and submission of the face image in the request may function as all or part of the verification credentials (e.g., login credentials) for the user 132.

In the middle appearance shown in FIG. 4, the graphical user interface indicates that the request to verify the user has been authenticated (e.g., has been deemed to be an authentic request) and that, additionally, the user's verification credentials have resulted in a successful verification (e.g., successful login). However, in the right appearance shown in FIG. 4, the graphical user interface indicates that the request to verify the user has not been authenticated (e.g., has been deemed to be a falsified or otherwise non-authentic request) and that—regardless whether the new user's verification credentials would have resulted in a successful verification—this attempt to verify the user has failed.

Figure 5:
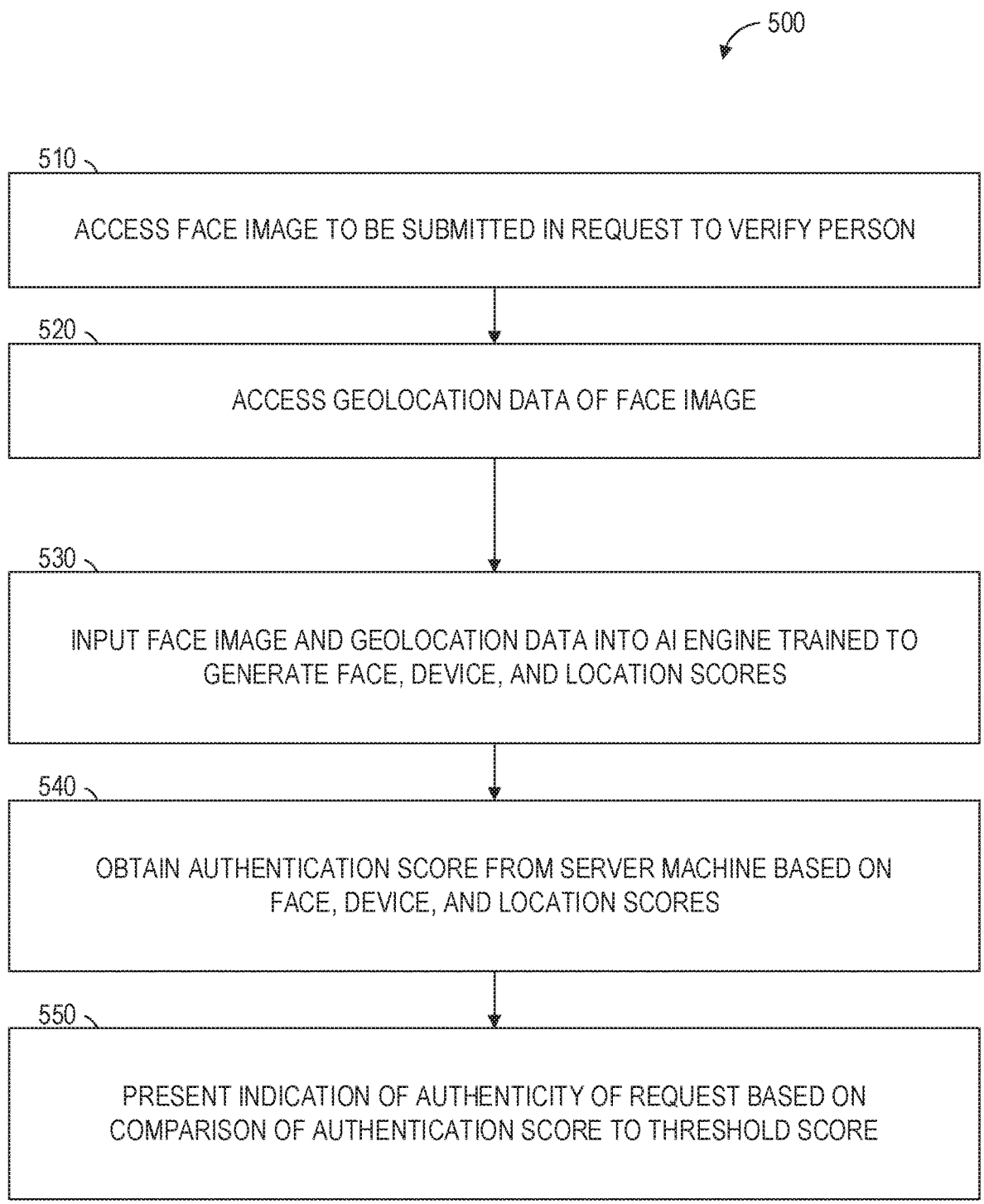
FIGS. 5 and 6 are flowcharts illustrating operations (e.g., of the device in performing a method of authenticating a verification request, according to some example embodiments.
Figure 6:
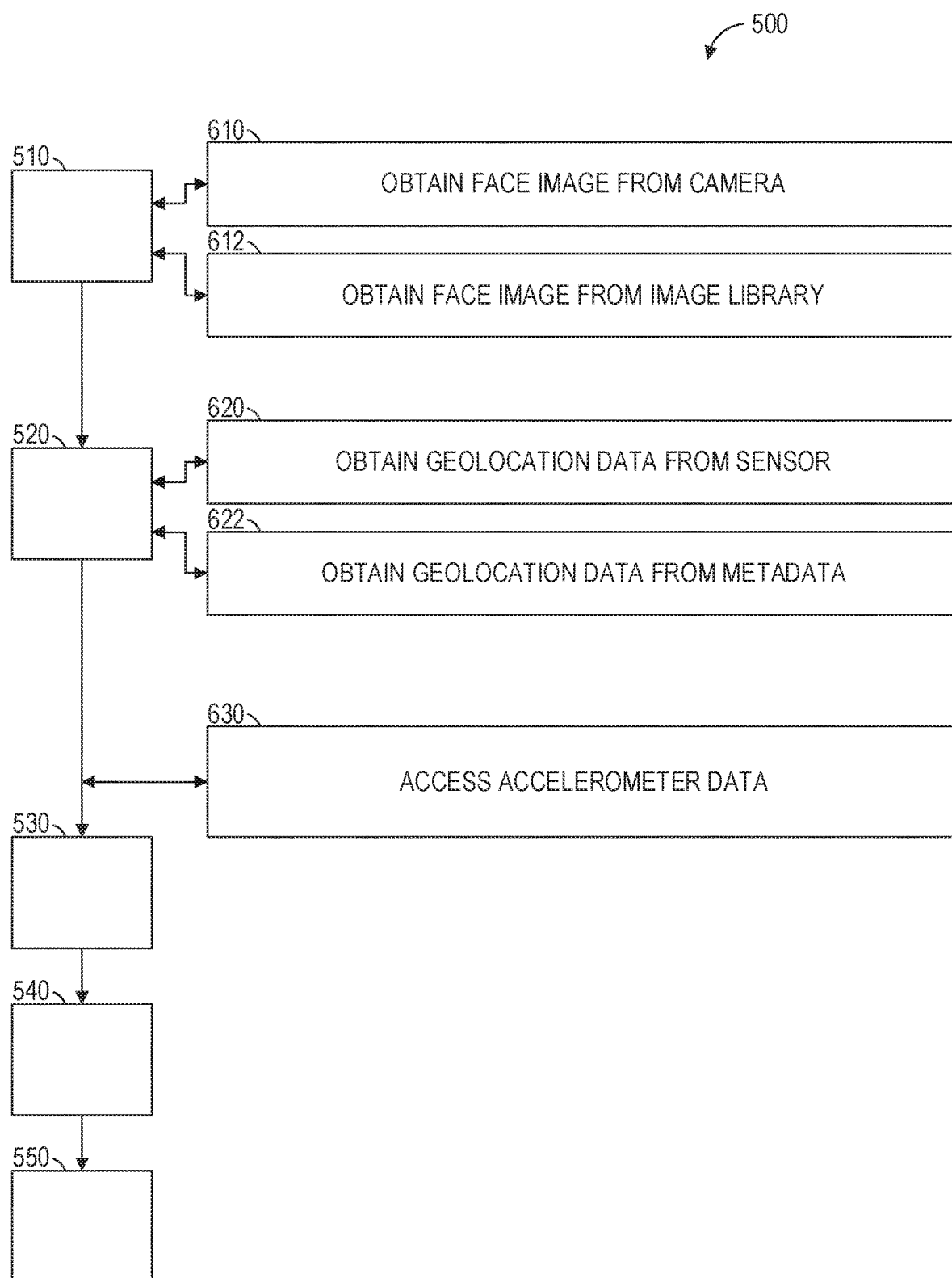

FIGS. 5 and 6 are flowcharts illustrating operations (e.g., of the device 130) in performing a method 500 of authenticating a verification request, according to some example embodiments. Although, for clarity and brevity, the present discussion focuses on performance of the method 500 by the device 130, one or more operations of the method 500 may be performed by the server machine 110 in certain example embodiments. Operations in the method 500 may be performed using components (e.g., modules) described above with respect to FIG. 3, using one or more processors (e.g., microprocessors or other hardware processors), or using any suitable combination thereof. As shown in FIG. 5, the method 500 includes operations 510, 520, 530, 540, and 550.

In operation 510, the authentication client 310 accesses an image to be submitted in a request to verify a person (e.g., a request to verify the user 132). The image may be a face image that depicts the face of the user 132 and that was captured by the camera 330 of the device 130. Since the image was captured by the camera 330, the image may include a characteristic noise pattern inserted by the camera 330 into images captured therefrom or otherwise caused by the camera 330 to be present in images captured therefrom. The characteristic noise pattern indicates a set of one or more manufacturing deviations that occurred during manufacture of the camera 330. For example, the characteristic noise pattern may indicate the presence of one or more manufacturing errors, flaws, or other defects in the camera 330.

In operation 520, the authentication client 310 accesses geolocation data (e.g., GPS data or IP address data) that represents a geolocation at which the device 130 was located during capture of the image (e.g., face image) accessed in operation 510.

In operation 530, the authentication client 310 inputs the accessed image (e.g., face image) and the accessed geolocation data into the artificial intelligence engine 270 (e.g., a neural network). The artificial intelligence engine 270 is trained to generate an image score (e.g., a face score) based on the inputted image, generate a device score based on the characteristic noise pattern in the inputted image, and generate a location score based on the inputted geolocation data. For example, where the image is a face image, the face analyzer 210 may generate a face score by performing a facial recognition analysis of the face image; the device analyzer 220 may generate a device score by performing a noise pattern analysis of the face image; and the location analyzer 230 may generate a location score by performing a geolocation analysis of the geolocation data. Accordingly, the artificial intelligence engine 270 generates and outputs the image score, the device score, and the location score, all in response to the inputting of the image and the geolocation data. As a result, the authentication client 310 obtains (e.g., receives) the image score, the device score, and the location score from the artificial intelligence engine 270.

In operation 540, the authentication client 310 sends the obtained image score (e.g., face score), the obtained device score, and the obtained location score to the server machine 110 (e.g., to the authentication server 260) to obtain an authentication score in response. This may be performed by providing (e.g., submitting) the verification request to the server machine 110 via the network 190, where the verification request includes the image score, the device score, and the location score. Accordingly, the server machine 110 (e.g., via the artificial intelligence engine 280 and its included authenticator 240) generates the authentication score based on the provided image score (e.g., face score), the provided device score, and the provided location score. As a result, the authentication client 310 obtains the generated authentication score from the server machine 110.

In operation 550, the authentication client 310 presents an indication that the verification request is authentic. The presentation of this indication may be performed using a graphical user interface (e.g., similar to that described above with respect to FIG. 4), and the presentation of this indication may be based on a comparison of the obtained authentication score to a threshold authentication score. In this sense, the threshold authentication score may define a boundary (e.g., tipping point) between verification requests that will be deemed to be authentic and verification requests that will be deemed to be non-authentic (e.g., falsified).

As shown in FIG. 6, the method 500 may include one or more of operations 610, 612, 620, 622, and 630. In some example embodiments, the image (e.g., face image) is obtained from the camera 330 of the device 130, and the geolocation data is obtained from the geolocation sensor 340 of the device 130. In such example embodiments, operation 610 may be performed as part (e.g., a precursor task, a subroutine, or a portion) of operation 510, and operation 620 may be performed as part of operation 520.

In operation 610, in accessing the image (e.g., face image), the authentication client 310 obtains the image from the camera 330 of the device 130. For example, this may occur during live capture of the image (e.g., the taking of the selfie of the user 132) by the camera 330.

In operation 620, in accessing the geolocation data, the authentication client 310 obtains (e.g., receives) the geolocation data from the geolocation sensor 340 of the device 130. For example, this may complement live capture of the image and accordingly obtain live geolocation data that indicates the geolocation of the device 130 at the time that the image is captured.

In certain example embodiments, the image (e.g., face image) is obtained from the image library 320 of the device 130, and the geolocation data is obtained from metadata of the image (e.g., stored in the header of the image). In such example embodiments, operation 612 may be performed as part of operation 510, and operation 622 may be performed as part of operation 520.

In operation 612, in accessing the image (e.g., face image), the authentication client 310 obtains the image from the image library 320 of the device 130. For example, this may occur when a previously captured image (e.g., a previously taken selfie of the user 132) is to be submitted in a request to verify the user 132.

In operation 622, in accessing the geolocation data, the authentication client 310 obtains (e.g., reads) the geolocation data from the metadata of the image. For example, this may complement the use of a previously captured image and accordingly obtain corresponding geolocation data that indicates the location of the device 130 at the time that the image was captured.

In various example embodiments, one or more movements of the device 130 are analyzed by the artificial intelligence engine 280 and used as a basis for determining the authentication score in operation 540. In such example embodiments, operation 630 is performed prior to operation 540.

In operation 630, the authentication client 310 accesses accelerometer data generated by the accelerometer 350 of the device 130. For example, this may occur during live capture of the accelerometer data as the user 132 is interacting with the graphical user interface shown in FIG. 4). The accelerometer data indicates one or more movements made by the device 130. In example embodiments in which the image (e.g., face image) is captured live from the camera 330 of the device 130, the accelerometer data may be similarly captured live and indicate one or more movements made by the device 130 during capture of the image. In example embodiments in which the image is obtained from the image library 320 of the device 130, the accelerometer data may be either captured live and thus indicate one or more live movements made by the device 130 or otherwise obtained from the metadata of the image and thus indicate one or more past movements made by the device 130 (e.g., during capture of the image).

In example embodiments that include operation 630, the artificial intelligence engine 270 (e.g., device analyzer 220) is trained to generate the device score based on the accessed accelerometer data. For example, the artificial intelligence engine 270 may perform a movement analysis of the accelerometer data and generate the device score based on results thereof. Accordingly, in response to performance of operation 630, the device score obtained in operation 530 may be generated by the artificial intelligence engine 270 based on results of such a movement analysis of the accelerometer data.

According to some example embodiments, the artificial intelligence engine 270 (e.g., face analyzer 210) is trained to generate the image score (e.g., face score) based on a liveness analysis of the image (e.g., face image). For example, the artificial intelligence engine 270 may perform a liveness analysis of the image and generate the face score based on results thereof. Accordingly, in response to performance of the liveness analysis (e.g., an analysis that generates or otherwise determines a likelihood that the image depicts a live person), the image score (e.g., face score) obtained in operation 530 may be generated by the artificial intelligence engine 270 based on results of the liveness analysis of the image.

According to certain example embodiments, the artificial intelligence engine 270 (e.g., location analyzer 230) is trained to generate the location score based on a background analysis of the image (e.g., face image). For example, the artificial intelligence engine 270 may segment the image into a foreground portion and a background portion, perform a background analysis of the background portion, and generate the location score based on results thereof. Accordingly, in response to performance of the background analysis, the location score obtained in operation 530 may be generated by the artificial intelligence engine 270 based on results of the background analysis of the image.

According to various example embodiments, the artificial intelligence engine 270 (e.g., location analyzer 230) is trained to generate the location score based on a metadata analysis of the image (e.g., face image). For example, the artificial intelligence engine 270 may perform a metadata analysis of one or more portions of the metadata (e.g., one or more descriptors stored in the header of the image) and generate the location score based on results thereof. Accordingly, in response to performance of the metadata analysis, the location score obtained in operation 530 may be generated by the artificial intelligence engine 270 based on results of the metadata analysis.

Figure 7:
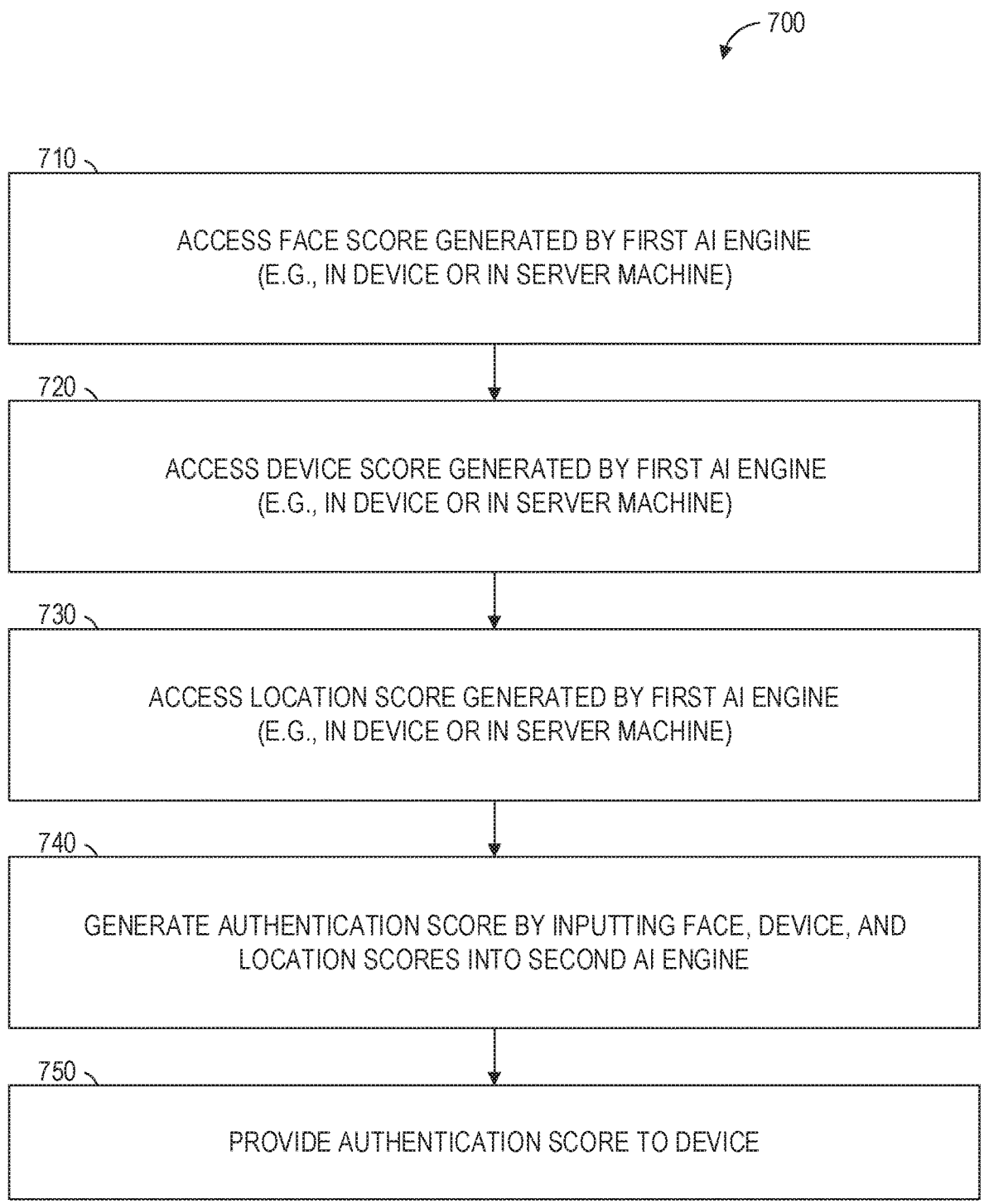
FIGS. 7 and 8 are flowcharts illustrating operations (e.g., of the server machine) in performing a method of authenticating a verification request, according to some example embodiments.
Figure 8:
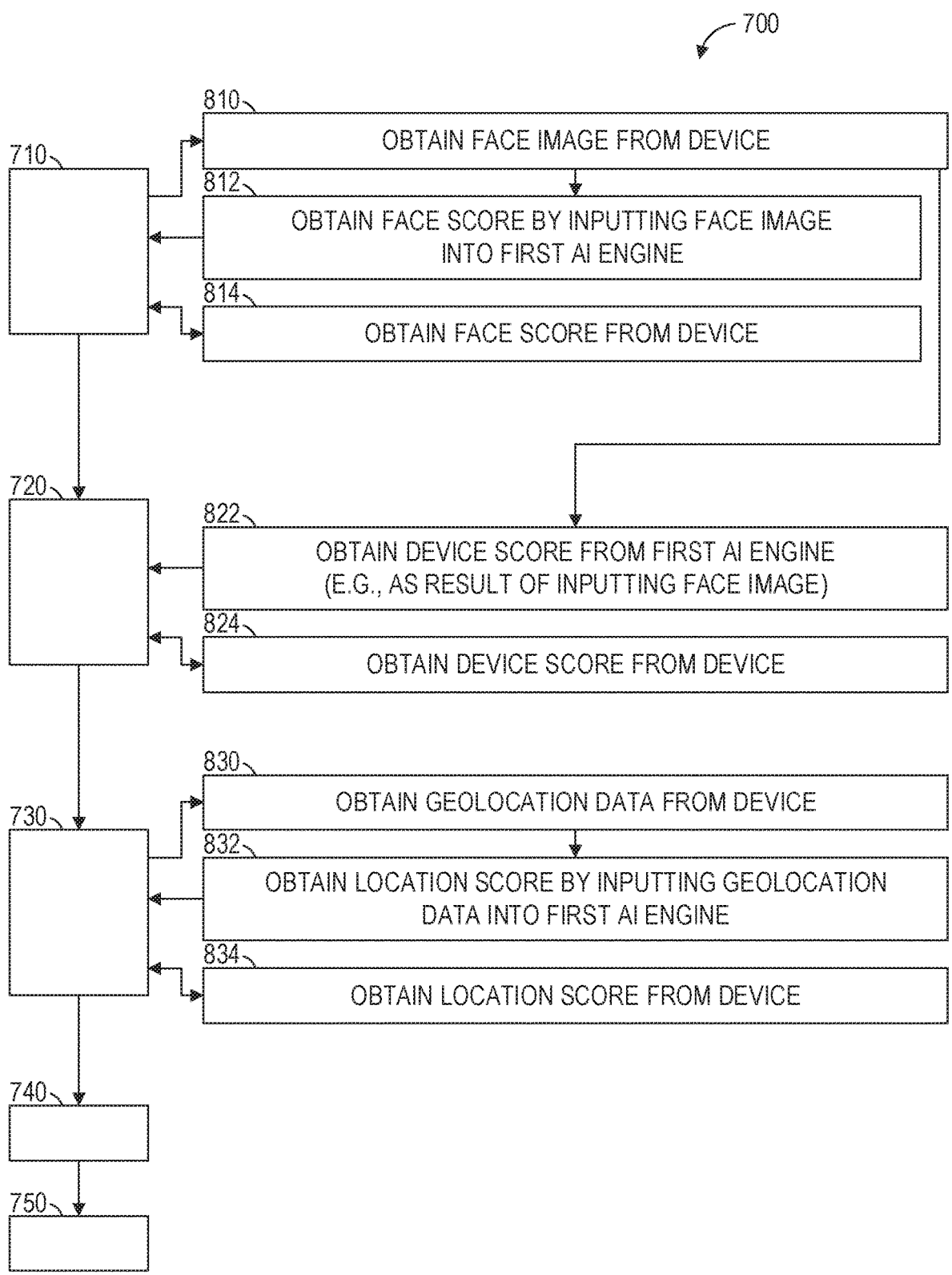

FIGS. 7 and 8 are flowcharts illustrating operations (e.g., of the server machine 110) in performing a method 700 of authenticating a verification request, according to some example embodiments. Although, for clarity and brevity, the present discussion focuses on performance of the method 700 by the server machine 110, one or more operations of the method 700 may be performed by the device 130 in certain example embodiments. Operations in the method 700 may be performed using components (e.g., modules) described above with respect to FIG. 2, using one or more processors (e.g., microprocessors or other hardware processors), or using any suitable combination thereof. As shown in FIG. 7 the method 700 includes operations 710, 720, 730, 740, and 750.

In operation 710, the authentication server 260 accesses an image score (e.g., face score) generated by the artificial intelligence engine 270, which may be considered a first artificial intelligence engine in this context. For example, the image score may be a face score that is generated by the face analyzer 210 in the artificial intelligence engine 270 (e.g., located at the device 130 or at the server machine 110) and received in a request to verify a person (e.g., a request to verify the user 132). As noted above, the image may depict the face of the person user 132), be captured by the camera 330 of the device 130, and include a characteristic noise pattern inserted by the camera 330 into images captured by the camera 330. As an example, the authentication server 260 may perform operation 710 by accessing the same image score discussed above with respect to operation 540.

In operation 720, the authentication server 260 accesses a device score generated by the artificial intelligence engine 270 (e.g., the first artificial intelligence engine). For example, the device score may be generated by the device analyzer 220 in the artificial intelligence engine 270 (e.g., located at the device 130 or at the server machine 110) and received in the request to verify the person (e.g., the request to verify the user 132). The device score may be generated based on the characteristic noise pattern included in the image whose image score was accessed in operation 710. As an example, the authentication server 260 may perform operation 720 by accessing the same device score discussed above with respect to operation 540.

In operation 730, the authentication server 260 accesses the location score generated by the artificial intelligence engine 270 (e.g., the first artificial intelligence engine). For example, the location score may be generated by the location analyzer 230 in the artificial intelligence engine 270 (e.g., located at the device 130 or at the server machine 110) and received in the request to verify the person (e.g., the request to verify the user 132). As noted above, the location score may be generated based on geolocation data that specifies a geolocation at which the device 130 is located (e.g., during capture of the image whose image score was accessed in operation 710). As an example, the authentication server 260 may perform operation 730 by accessing the same location score discussed above with respect to operation 540.

In operation 740, the authentication server 260 generates the authentication score by inputting the accessed image score (e.g., face score), the accessed device score, and the accessed location score into the artificial intelligence engine 280 (e.g., authenticator 240), which may be considered a second artificial intelligence engine in this context, and obtaining the authentication score output from that artificial intelligence engine 280 (e.g., second artificial intelligence engine). For example, the authentication server 260 may perform operation 740 by inputting the same image score (e.g., face score), device score, and location score discussed above with respect to operation 540 into the artificial intelligence engine 280 and obtaining (e.g., receiving) the authentication score thus generated.

In operation 750, the authentication server 260 provides the obtained authentication score to the device 130 via the network 190. The providing of this authentication score to the device 130 may function as a trigger to command or otherwise cause the device 130 (e.g., via the authentication client 310) to perform operation 550 in which the authentication client 310 presents an indication that the verification request is authentic. As noted above, the presentation of the indication may be based on a comparison of the provided authentication score to a threshold authentication score.

As shown in FIG. 8, the method 700 may include one or more of operations 810, 812, 814, 822, 824, 830, 832, and 834. In some example embodiments, the verification request includes an image (e.g., face image) from which the image score (e.g., face score) is to be generated, and in such cases, the device score, the location score, or both, may yet to be generated as well. Accordingly, operations 810 and 812 may be performed as part of operation 710; the operation 822 may be performed as part of operation 720; and operations 830 and 832 may be performed as part of operation 730.

In operation 810, in accessing the image score (e.g., face score), the authentication server 260 obtains (e.g., accesses or receives) the corresponding image (e.g., face image) from the device 130 via the network 190). As noted above, the image may be a captured live by the camera 330 of the device 130 or retrieved from the image library 320 of the device 130.

In operation 812, in accessing the image score e.g., face score), the authentication server 260 obtains the image score by inputting the image (e.g., face image) obtained in operation 810 into the artificial intelligence engine 270 the first artificial intelligence engine) and obtaining the image score as output from the artificial intelligence engine 270.

In operation 822, in accessing the device score, the authentication server 260 obtains the device score from the artificial intelligence engine 270 (e.g., the first artificial intelligence engine). For example, the device score may be obtained as an output from the artificial intelligence engine 270 as a result of the image (e.g., face image) being input into the artificial intelligence engine 270 (e.g., during performance of operation 812).

In operation 830, in accessing the location score, the authentication server 260 obtains the corresponding geolocation data from the device 130 (e.g., via the network 190). As noted above, the geolocation data may be captured live by the geolocation sensor 340 of the device 130 or accessed from metadata of the image.

In operation 832, in accessing the location score, the authentication server 260 obtains the location score by inputting the geolocation data obtained in operation 830 into the artificial intelligence engine 270 (e.g., the first artificial intelligence engine) and obtaining the location score as output from the artificial intelligence engine 270.

In certain example embodiments, the verification request includes precomputed scores, namely, the image score (e.g., face score), the device score, and the location score. In such example embodiments, operation 814 may be performed as part of operation 710; operation 824 may be performed as part of operation 720; and operation 834 may be performed as part of operation 730.

In operation 814, in accessing the image score (e.g., face score), the authentication server 260 obtains (e.g., accesses or receives) the image score from the device 130 (e.g., via the network 190). For example, the authentication server 260 may receive the image score provided by the device 130 in performing operation 540.

In operation 824, in accessing the device score, the authentication server 260 obtains the device score from the device 130 (e.g., via the network 190). For example, the authentication server 260 may receive the device score provided by the device 130 in performing operation 540.

In operation 834, in accessing the location score, authentication server 260 obtains the location score from the device 130 (e.g., via the network 190). For example, the authentication server 260 may receive the location score provided by the device 130 in performing operation 540

Figure 9:
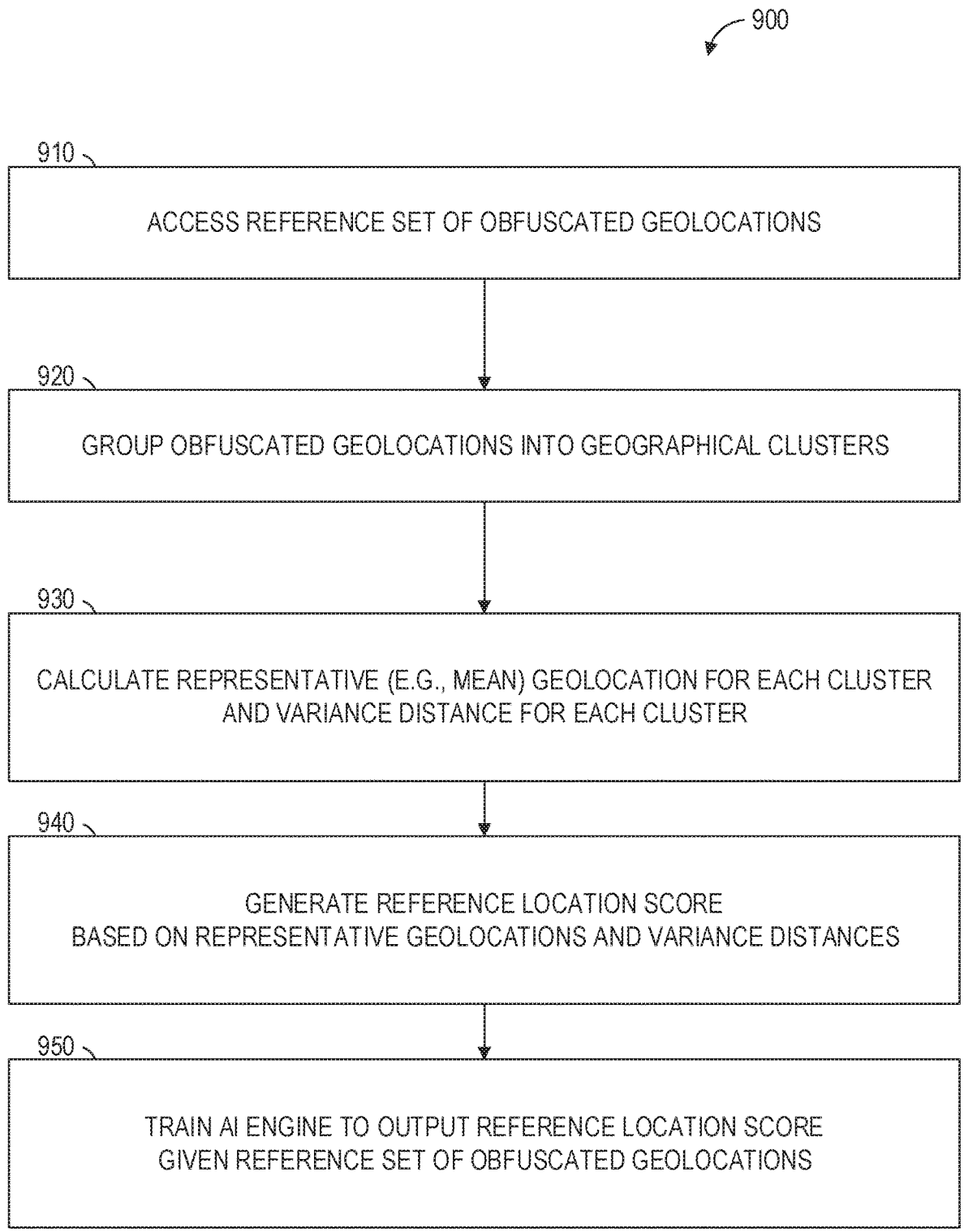
FIGS. 9 and 10 are flowcharts illustrating operations (e.g., of the server machine) in performing a method of training an artificial intelligence engine to facilitate authentication of verification requests, according to some example embodiments.
Figure 10:
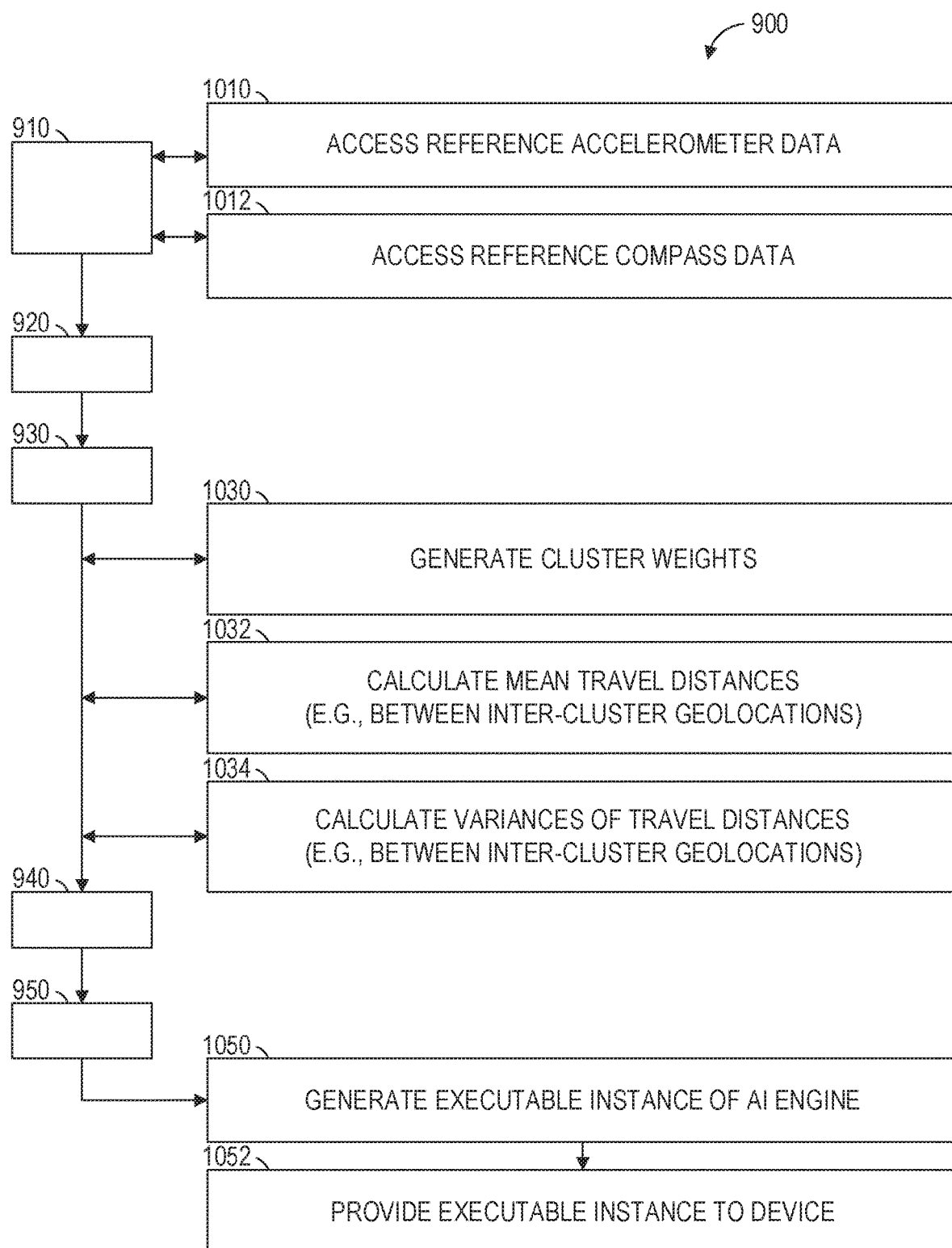

FIGS. 9 and 10 are flowcharts illustrating operations (e.g., of the server machine 110) in performing a method 900 of fully or partially (e.g., at least partially) training an artificial intelligence engine (e.g., artificial intelligence engine 270) to facilitate authentication of verification requests, according to some example embodiments. Although, for clarity and brevity, the present discussion focuses on performance of the method 900 by the server machine 110, one or more operations of the method 900 may be performed by the device 130 in certain example embodiments. Operations in the method 900 may be performed using components (e.g., modules) described above with respect to FIG. 2, using one or more processors (e.g., microprocessors or other hardware processors), or using any suitable combination thereof. As shown in FIG. 9 the method 900 includes operations 910, 920, 930, 940, and 950.

In operation 910, the artificial intelligence engine trainer 250 accesses a reference set of obfuscated geolocations (e.g., a training set of geolocations that have been obfuscated as described below). For example, the reference set may be stored by the server machine 110 and accessed from its local storage or memory, stored by the database 115 and accessed therefrom, stored by the device 130 and accessed therefrom, stored by a different device (e.g., device 150) and accessed therefrom, or any suitable combination thereof. The obfuscated geolocations in the reference set are generated from (e.g., obfuscated based on) actual geolocations and correspond to these actual geolocations. For example, these actual geolocations may be geolocations from which a device (e.g., device 130) submitted a set of one or more requests to verify a person (e.g., user 132). According to various example embodiments, the reference set of obfuscated geolocations is generated by quantizing the actual geolocations, adding noise (e.g., random or pseudorandom) to the actual geolocations, encrypting the actual geolocations, or any suitable combination thereof.

In operation 920, the artificial intelligence engine trainer 250 groups (e.g., clusters) the obfuscated geolocations from the reference set into geographical clusters, and this grouping (e.g., clustering) of the obfuscated geolocations is based on a cluster radius value (e.g., a geographical distance that defines the radius of the resulting clusters), which may be predetermined (e.g., hardcoded or otherwise determined prior to runtime) or dynamically determined at runtime.

In operation 930, the artificial intelligence engine trainer 250 determines (e.g., calculates) a corresponding representative geolocation for each geographical cluster that was grouped in operation 920. As an example, for each geographical cluster, the artificial intelligence engine trainer 250 may calculate a corresponding mean geolocation of that geographical cluster. As part of operation 930, the artificial intelligence engine trainer 250 also determines a corresponding variance distance from the representative geolocation for each geographical cluster that was grouped in operation 920. As an example, for each geographical cluster, the artificial intelligence engine trainer 250 may calculate a corresponding variance distance from the mean geolocation of that geographical cluster.

In operation 940, the artificial intelligence engine trainer 250 generates a reference location score (e.g., a model location score or a model enrollment score) based on the representative geolocations of the geographical clusters and based on the corresponding variance distances of the geographical clusters that were created in operation 920. In some example embodiments, the reference location score is generated (e.g., computed) based on the proportion (e.g., ratio) of non-singleton geographical clusters (e.g., geographical clusters with two or more geolocations) to the total number of geolocations across all of the geographical clusters. In alternative example embodiments, this proportion is not used.

In operation 950, the artificial intelligence engine trainer 250 trains an artificial intelligence engine (e.g., the artificial intelligence engine 270) to output the reference location score in response to the reference set of obfuscated geolocations being input into that artificial intelligence engine. As noted above, the artificial intelligence engine may be trained to output additional information (e.g., a face score and the device score) as well.

As shown in FIG. 10, the method 900 may include one or more of operations 1010, 1012, 1030, 1032, 1034, 1050, and 1052. One or both of operations 1010 and 1012 may be performed as part of operation 910.

In operation 1010, in accessing the reference set of obfuscated geolocations, the artificial intelligence engine trainer 250 accesses corresponding reference accelerometer data that indicates corresponding movements made by the device 130. The accelerometer data may have been previously captured live by the accelerometer 350 of the device 130 and stored in metadata of one or more images (e.g., in the image library 320 of the device 130 or in the database 115), for subsequent access therefrom. In example embodiments that include operation 1010, the generating of the reference location score in operation 940 may be performed based on the accessed accelerometer data.

In operation 1012, in accessing the reference set of obfuscated geolocations, the artificial intelligence engine trainer 250 accesses corresponding reference compass data that indicates corresponding directions in which the device 130 was oriented. A compass data may have been previously captured live by the compass 360 of the device 130 and stored in metadata of one or more images in the image library 320 of the device 130 or in the database 115) for subsequent access therefrom. In example embodiments that include operation 1012, the generating of the reference location score in operation 940 may be performed based on the accessed compass data.

As shown in FIG. 10, one or more of operations 1030, 1032, and 1034 may be performed between operations 930 and 940. Generally, though, one or more of operations 1030, 1032, and 1034 may be performed between operations 920 and 940.

In operation 1030, the artificial intelligence engine trainer 250 generates cluster weights for the geographical clusters grouped in operation 920. This may be performed by generating a corresponding weight for each geographical cluster among the geographical clusters created in operation 920. Moreover, the corresponding weight for each geographical cluster may be generated based on a corresponding count of obfuscated geolocations in that geographical cluster. In example embodiments that include operation 1030, the generating of the reference location score in operation 940 may be performed based on the generated cluster weights.

In operation 1032, the artificial intelligence engine trainer 250 calculates mean travel distances for the geographical clusters that were grouped in operation 920. This may be performed by calculating a corresponding mean inter-cluster travel distance between successive geolocations that lie in different geographical clusters among the geographical clusters created in operation 920. For example, the artificial intelligence engine trainer 250 may calculate a set of inter-cluster travel distances between inter-cluster pairs of geolocations and then calculate a mean of those inter-cluster travel distances. In example embodiments that include operation 1032, the generating of the reference location score in operation 940 may be performed based on the calculated mean travel distances.

In operation 1034, the artificial intelligence engine trainer 250 calculates variances from the mean travel distances for the geographical clusters grouped in operation 920. This may be performed by calculating a corresponding variance of inter-cluster travel distances (e.g., as deviations from the mean inter-cluster travel distance) for each geographical cluster. Thus, the artificial intelligence engine trainer 250 may calculate a corresponding variance of inter-cluster travel distances between successive geolocations in different geographical clusters among the geographical clusters created in operation 920. In example embodiments that include operation 1034, the generating of the reference location score in operation 940 may be performed based on the calculated variances in the travel distances for the geographical clusters.

Furthermore, in some example embodiments, the artificial intelligence engine trainer 250 trains the artificial intelligence engine (e.g., artificial intelligence engine 270) to output the reference location score based on a comparison of a maximum travel speed (e.g., a predetermined maximum travel speed) to one or more travel speeds between pairs of successive geolocations. In some implementations, these pairs include one or more pairs of successive geolocations that lie in different geographical clusters among the geographical clusters discussed above with respect to operation 920. For example, the artificial intelligence engine trainer 250 may access or calculate inter-cluster travel times between inter-cluster pairs of geolocations, access or calculate inter-cluster travel distances corresponding to these inter-cluster travel times, and accordingly train the artificial intelligence engine to calculate inter-cluster travel speeds and then compare the inter-cluster travel speeds to the maximum travel speed. In certain implementations, these pairs include one or more pairs of successive geolocations that lie within the same geographical cluster. For example, the artificial intelligence engine trainer 250 may access or calculate intra-cluster travel times between intra-cluster pairs of geolocations, access or calculate intra-cluster travel distances corresponding to these intra-cluster travel times, and accordingly train the artificial intelligence engine to calculate intra-cluster travel speeds and then compare the intra-cluster travel speeds to the maximum travel speed.

As shown in FIG. 10, one or both of operations 1050 and 1052 may be performed after operation 950. In operation 1050, the artificial intelligence engine trainer 250 generates an executable instance of the artificial intelligence engine (e.g., artificial intelligence engine 270) trained in operation 950. This may be performed by compiling the trained artificial intelligence engine, packaging the resulting executable file (e.g., within an automatic installer program), compressing the executable file, or any suitable combination thereof. In some example embodiments, the authentication server 260 performs this operation.

In operation 1052, the artificial intelligence engine trainer 250 provides the executable instance of the artificial intelligence engine (e.g., artificial intelligence engine 270) to the device 130 (e.g., via the network 190). In some example embodiments, the authentication server 260 performs this operation. The provision of the executable instance (e.g., within an automatic installer program) may cause the device 130 to configure itself to obfuscate an actual geolocation of the device 130, input the obfuscated geolocation into the executable instance of the artificial intelligence engine, and obtain a corresponding candidate location score as output from the artificial intelligence engine, as well as perform these configured operations.

Figure 11:
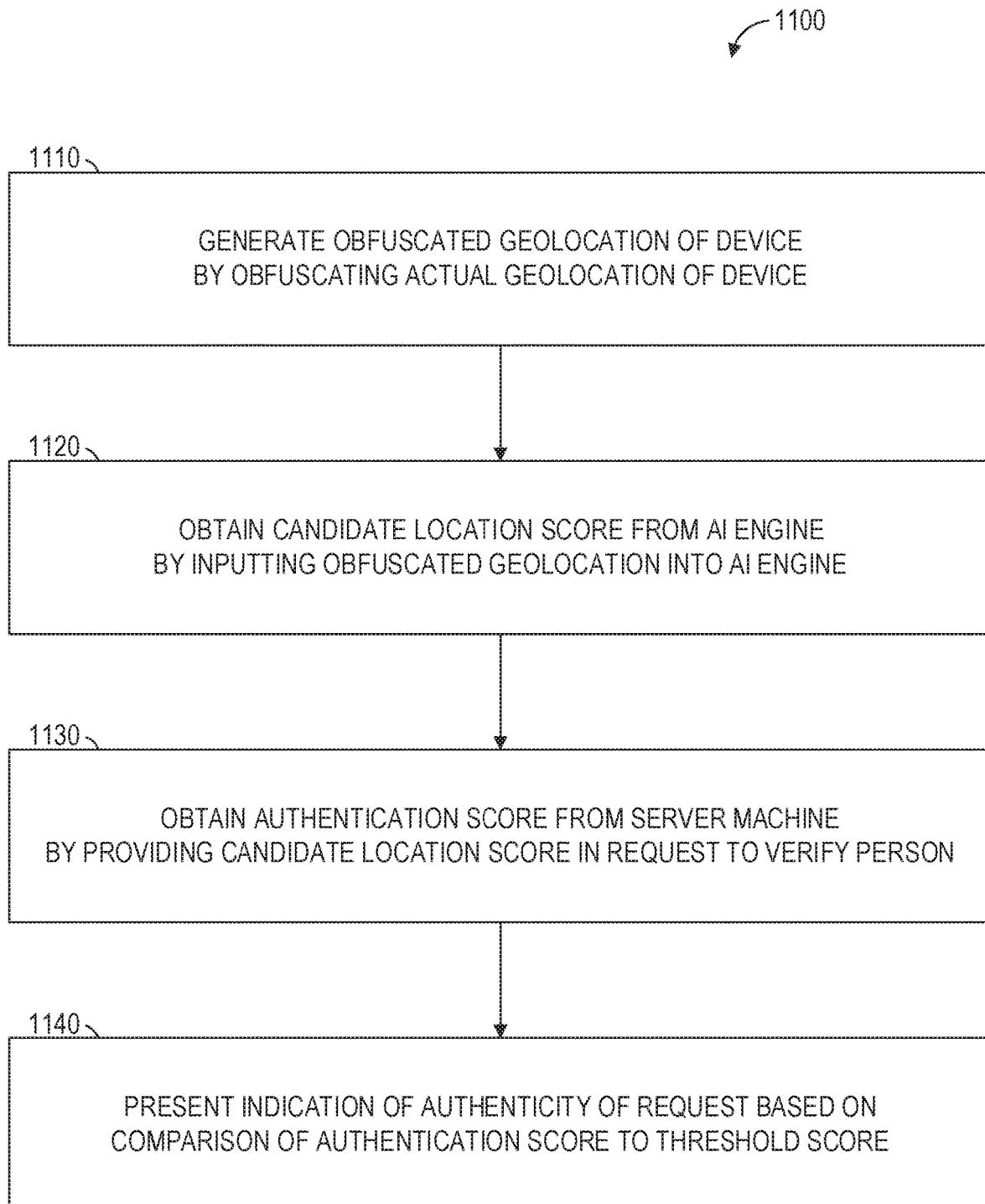
FIGS. 11 and 12 are flowcharts illustrating operations (e.g., of the device) in performing a method of using the trained artificial intelligence engine in authenticating a verification request, according to some example embodiments.
Figure 12:
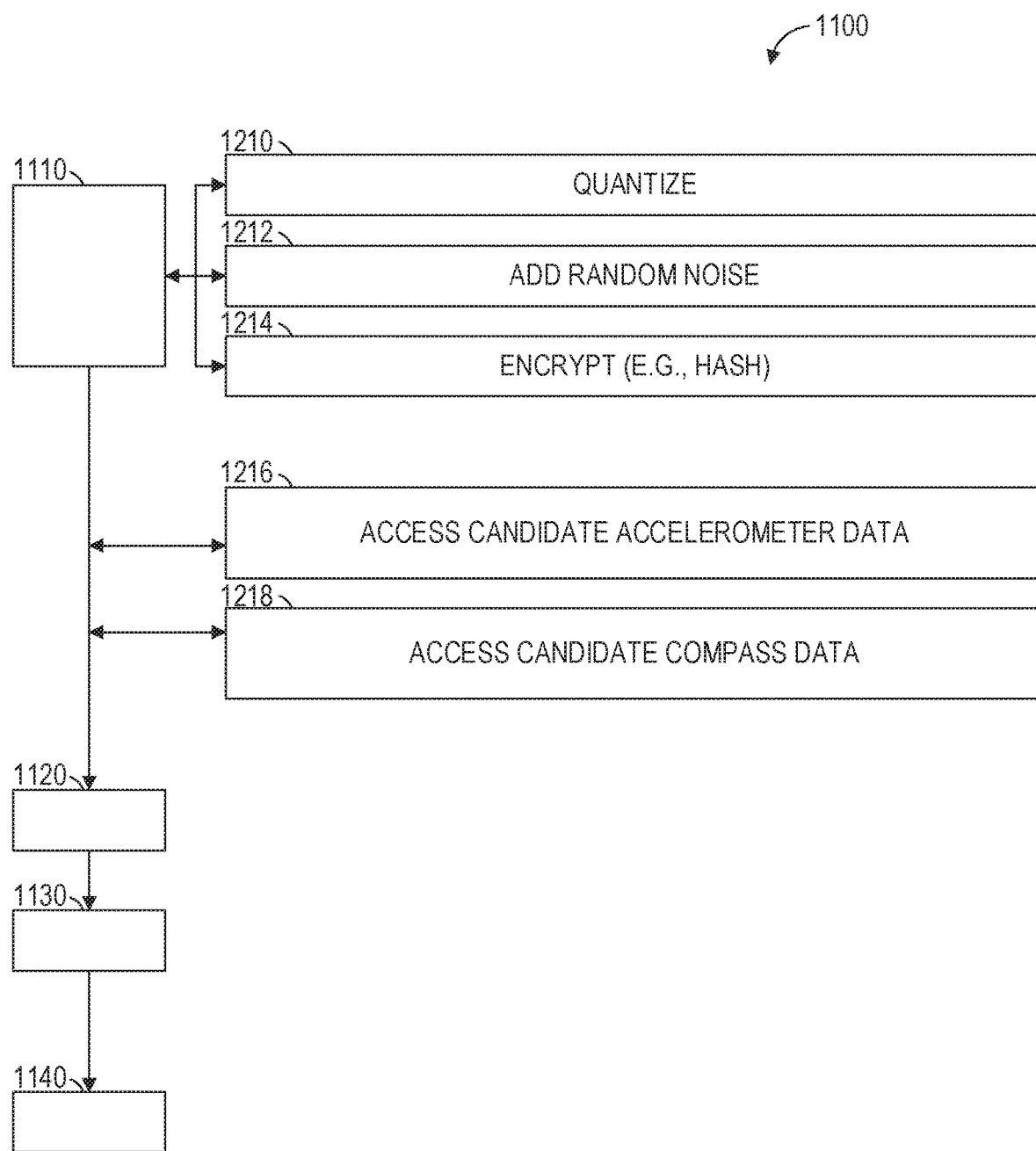

FIGS. 11 and 12 are flowcharts illustrating operations (e.g., of the device 130) in performing a method 1100 of using a trained artificial intelligence engine (e.g., artificial intelligence engine 270, as provided to the device 130 in operation 1052 of the method 900) in authenticating a verification request, according to some example embodiments. Although, for clarity and brevity, the present discussion focuses on performance of the method 1100 by the device 130, one or more operations of the method 1100 may be performed by the server machine 110 in certain example embodiments. Operations in the method 1100 may be performed using components (e.g., modules) described above with respect to FIG. 3, using one or more processors (e.g., microprocessors or other hardware processors), or using any suitable combination thereof. As shown in FIG. 11, the method 1100 includes operations 1110, 1120, 1130, and 1140.

In operation 1110, the authentication client 310 generates an obfuscated geolocation of the device 130. This may be performed by obfuscating an actual geolocation of the device 130. For example, the authentication client 310 may access (e.g., receive) the actual geolocation of the device 130 from the geolocation sensor 340. As examples, the actual geolocation may take the form of GPS coordinates, an IP address, or any suitable combination thereof. Examples of obfuscation operations are discussed below.

In operation 1120, the authentication client 310 obtains a candidate location score from a trained artificial intelligence engine (e.g., artificial intelligence engine 270, which may be called a first artificial intelligence engine or first AI module in this context). This may be performed by inputting the obfuscated geolocation generated in operation 1110 into the trained artificial intelligence engine and obtaining (e.g., receiving) the candidate location score as an output of the trained artificial intelligence engine. As noted above, the artificial intelligence engine is trained to output the reference location score in response to the reference set of obfuscated geolocations being input into the artificial intelligence engine. As also noted above, the reference set of obfuscated geolocations was generated from and corresponds to a set of actual geolocations from which the device 130 submitted requests to verify a person (e.g., user 132).

In response to the obfuscated geolocation from operation 1110 being input into the trained artificial intelligence engine (e.g., artificial intelligence engine 270), the artificial intelligence engine generates the candidate location score based on the inputted obfuscated geolocation of the device 130. Moreover, according to various example embodiments, the candidate location score may be generated based on the cluster weights discussed above with respect to operation 1030, the mean travel distances discussed above with respect to operation 1032, the variances discussed above with respect to operation 1034, reference accelerometer data accessed in operation 1010, reference compass data accessed in operation 1012, or any suitable combination thereof.

Furthermore, in some example embodiments, the artificial intelligence engine (e.g., artificial intelligence engine 270) is trained (e.g., by the artificial intelligence engine trainer 250) to output the reference location score based on a comparison of a maximum travel speed (e.g., a predetermined maximum travel speed) to one or more travel speeds between pairs of successive geolocations (e.g., that lie in different geographical clusters or within the same geographical cluster among the geographical clusters discussed above with respect to operation 920). In some example embodiments, the artificial intelligence engine may be trained to calculate one or more inter-cluster travel speeds and then compare the inter-cluster travel speeds to the maximum travel speed. Accordingly, the artificial intelligence engine may generate the candidate location score based on a comparison of the maximum travel speed to an inter-cluster travel speed that is calculated based on the obfuscated geolocation of the device 130. In certain example embodiments, the artificial intelligence engine may be trained to calculate one or more intra-cluster travel speeds and then compare the intra-cluster travel speeds to the maximum travel speed. Accordingly, the artificial intelligence engine may generate the candidate location score based on a comparison of the maximum travel speed to an intra-cluster travel speed that is calculated based on the obfuscated geolocation of the device 130.

In operation 1130, the authentication client 310 obtains an authentication score based on the candidate location score. The authentication score may be obtained from the server machine 110 (e.g., via the artificial intelligence engine 280, which may be called a second artificial intelligence engine or second AI module in this context). For example, the authentication client may obtain the authentication score from the server machine 110 by providing the candidate location score to the server machine 110. The candidate location score may be provided within a request to verify the person (e.g., a request to verify the user 132). In response to being provided with the candidate location score, the server machine 110 (e.g., the authentication server 260, the artificial intelligence engine 280, the authenticator 240, or any suitable combination thereof) generates and provides the authentication score based on the candidate location score.

In operation 1140, the authentication client 310 presents an indication that the request to verify the person is authentic. Operation 1140 may be performed in a manner similar to that described above with respect to operation 550. Accordingly, the presentation of this indication may be performed using a graphical user interface (e.g., similar to that described above with respect to FIG. 4), and the presentation of this indication may be based on a comparison of the authentication score obtained in operation 1130 to a threshold authentication score. As noted above, the threshold authentication score may define a boundary between verification requests that will be deemed to be authentic and verification requests that will be deemed to be non-authentic (e.g., falsified).

As shown in FIG. 12, the method 1100 may include one or more of operations 1210, 1212, and 1214, any one or more of which may be performed as part of operation 1110. Operations 1210, 1212, and 1214 represent example ways to obfuscate an actual geolocation of the device 130 and thus generate an obfuscated geolocation of the device 130.

In operation 1210, the authentication client 310 quantizes the actual geolocation as all or part of obfuscating the actual geolocation. This is one manner in which the obfuscated geolocation can represent the actual geolocation for purposes of authenticating a verification request, without divulging the actual geolocation (e.g., to protect user privacy).

In operation 1212, the authentication client 310 adds noise (e.g., random or pseudorandom) to the actual geolocation as all or part of obfuscating the actual geolocation. This is another manner in which the obfuscated geolocation can represent the actual geolocation for purposes of authenticating the verification request, without divulging the actual geolocation.

In operation 1214, the authentication client 310 encrypts the actual geolocation as all or part of obfuscating the actual geolocation. This a further manner in which the obfuscated geolocation can represent the actual geolocation for purposes of authenticating the verification request, without divulging the actual geolocation.

According to various example embodiments, two or more of operations 1210, 1212, and 1214 may be combined (e.g., as serially performed operations) to obfuscate the actual geolocation and generate the obfuscated geolocation of the device 130.

As shown in FIG. 12, one or more of operations 1216 and 1218 may be performed prior to operation 1120, in which the authentication client 310 obtains a candidate location score from the trained artificial intelligence engine (e.g., artificial intelligence engine 270).

In operation 1216, the authentication client 310 accesses candidate accelerometer data that indicates a corresponding movement made by the device 130. In example embodiments that include operation 1216, the trained artificial intelligence engine (e.g., artificial intelligence engine 270) may be trained to output the reference location score based on reference accelerometer data that indicates corresponding movements made by the device 130 (e.g., as discussed above with respect to operation 1010). In such example embodiments, the trained artificial intelligence engine generates the candidate location score based on the candidate accelerometer data accessed in operation 1216.

In operation 1218, the authentication client 310 accesses candidate compass data that indicates a corresponding direction in which the device 130 is oriented. In example embodiments that include operation 1218, the trained artificial intelligence engine (e.g., artificial intelligence engine 270) may be trained to output the reference location score based on reference compass data that indicates corresponding directions in which the device 130 was oriented (e.g., as discussed above with respect operation 1012). In such example embodiments, the trained artificial intelligence engine generates the candidate location score based on the candidate compass data accessed in operation 1218.

Figure 13:
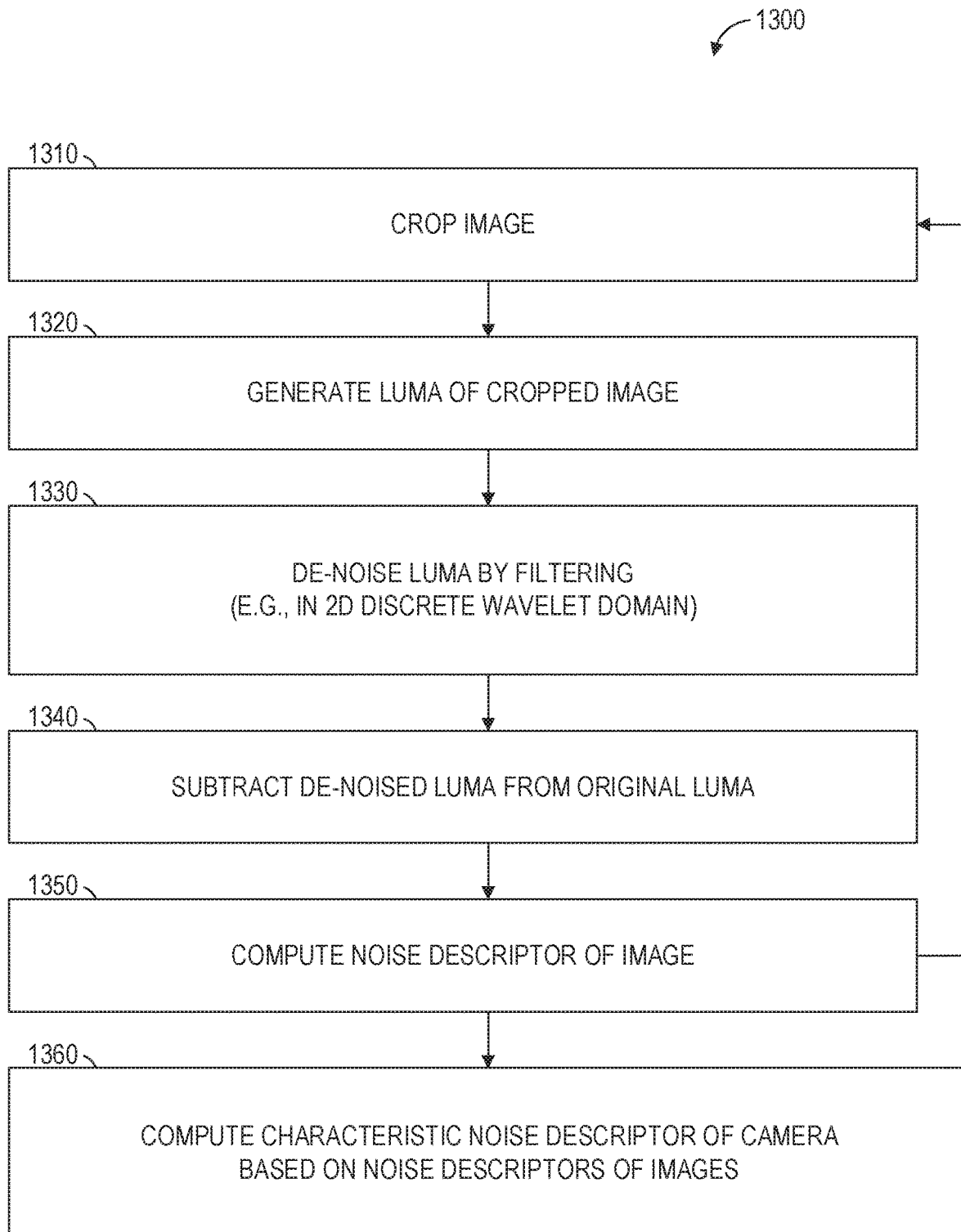
FIG. 13 is a flowchart illustrating operations (e.g., of the server machine or the device) in performing a method of obtaining a characteristic noise descriptor of a camera of a device, according to some example embodiments.

FIG. 13 is a flowchart illustrating operations (e.g., of the server machine 110 or the device 130) in performing a method of obtaining a characteristic noise descriptor of the camera 330 of the device 130, according to some example embodiments. Operations in the method 1300 may be performed by the artificial intelligence engine trainer 250 described above with respect to FIG. 2. In alternative example embodiments, the method 1300 may be performed by the authentication server 260, the authentication client 310, or any suitable combination thereof. As shown in FIG. 13, the method 1300 includes operations 1310, 1320, 1330, 1340, 1350, and 1360.

In operation 1310, the artificial intelligence engine trainer 250 begins processing an image (e.g., a face image) by cropping the image (e.g., to a predetermined uniform size for processing). For example, each image in a set of images (e.g., stored in the image library 320 of the device 130) may be cropped to a predetermined size (e.g., defined by predetermined pixel dimensions).

In operation 1320, the artificial intelligence engine trainer 250 obtains (e.g., generates) luma values of the cropped images. For example, this may be performed by calculating a corresponding luma value for each pixel in the cropped image, thus resulting in a luma map of the cropped image (e.g., a luma image having the same size as the cropped image or a luma-only version of the cropped image).

In operation 1330, the artificial intelligence engine trainer 250 de-noises the luma map of the cropped image. This may be performed by filtering the luma map. For example, the artificial intelligence engine trainer 250 may apply a de-noising filter in the two-dimensional discrete wavelet domain (2D DWD) to the luma map and obtain a de-noised luma map as output from the de-noising filter.

In operation 1340, the artificial intelligence engine trainer 250 subtracts the de-noised luma map from the original luma map prior to de-noising. The difference between these two luma maps is a luma difference map that represents a characteristic noise pattern inserted into the original image.

In operation 1350, the artificial intelligence engine trainer 250 generates (e.g., computes) a characteristic noise descriptor of the original image, such that the characteristic noise descriptor represents the characteristic noise pattern in the original image. This may be performed by calculating a first pointwise product by pointwise multiplying the luma difference map to the original luma map, calculating a second pointwise product by pointwise multiplying the original luma map to itself, and then calculating a ratio of the first pointwise product to the second pointwise product (e.g., by dividing the first pointwise product by the second pointwise product). The resulting noise descriptor map (e.g., noise descriptor image) is thus a characteristic noise descriptor of the original image and represents the characteristic noise pattern in the original image.

As shown in FIG. 13, operations 1310, 1320, 1330, 1340, and 1350 may be performed (e.g., iteratively) for each image in a set of images captured by the camera 330 of the device 130 (e.g., stored in, and accessed from, the image library 320 of the device 130). Accordingly, a set of resulting noise descriptor maps can be generated from the set of images captured by the camera 330.

In operation 1360, the artificial intelligence engine trainer 250 generates (e.g., computes) an overall characteristic noise descriptor for the camera 330 of the device 130. As one example, the artificial intelligence engine trainer 250 may compute a representative noise descriptor map (e.g., a mean noise descriptor map) from the set of images captured by the camera 330. As another example, the artificial intelligence engine trainer 250 may compute a first summation of the first pointwise products for all individual images, compute a second summation of the second pointwise products for all individual images, and then compute a ratio of the first summation to the second summation (e.g., by dividing the first summation by the second summation). The resulting overall noise descriptor map is thus a characteristic noise descriptor of the camera 330 and represents the characteristic noise pattern inserted by the camera 330 into images captured by the camera 330.

Figure 14:
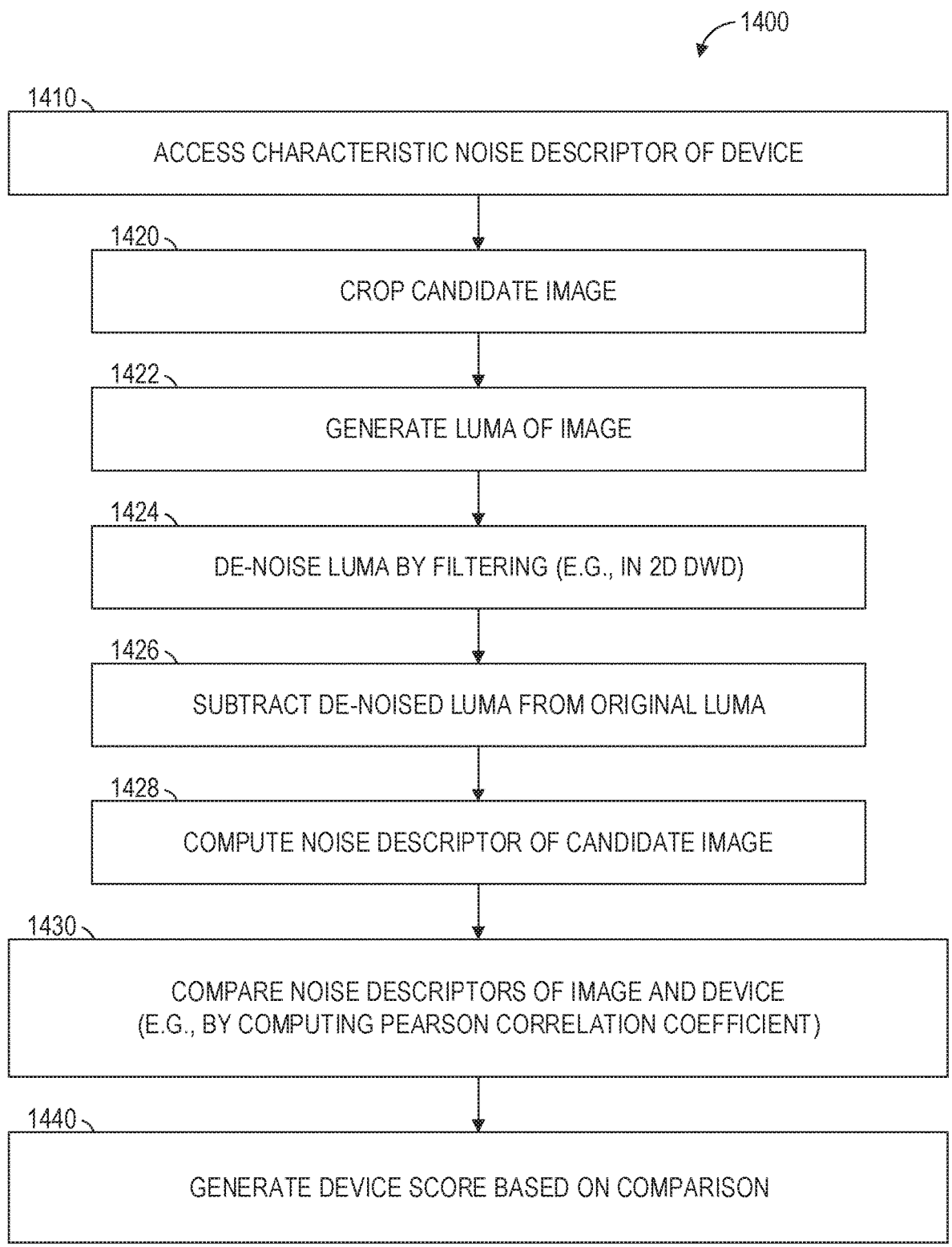
FIG. 14 is a flowchart illustrating operations (e.g., of the server machine or the device) in performing a method of using the characteristic noise descriptor of the camera of the device in generation of a device score, according to some example embodiments.

FIG. 14 is a flowchart illustrating operations (e.g., of the server machine 110 or the device 130) in performing a method of using the characteristic noise descriptor of the camera 330 of the device 130 in generation of a device score, according to some example embodiments. Operations in the method 1400 may be performed by the device analyzer 220 within the artificial intelligence engine 270 (e.g., located at the server machine 110 or at the device 130). As shown in FIG. 14, the method 1400 includes operations 1410, 1420, 1422, 1424, 1426, 1428, 1430, and 1440.

In operation 1410, the device analyzer 220 accesses the characteristic noise descriptor of the device 130 (e.g., the overall characteristic noise descriptor of the camera 330 of the device 130). As rioted above, the characteristic noise descriptor represents a characteristic noise pattern inserted by the camera 330 into images captured thereby. The characteristic noise descriptor of the camera 330 may be stored by the server machine 110 and accessed from its local storage or memory, stored by the database 115 and accessed therefrom, stored by the device 130 and accessed therefrom, stored by a different device (e.g., device 150) and accessed therefrom, or any suitable combination thereof.

In operation 1420, the device analyzer 220 crops a candidate image (e.g., a candidate face image to be submitted in a request to verify a person, such as the user 132). This may be the same image discussed above with respect to operation 510. For example, the candidate image may be in a manner similar to that described above with respect to operation 1310.

In operation 1422, the device analyzer 220 obtains a candidate luma map of the cropped candidate image. This may be performed in a manner similar to that described above with respect to operation 1320.

In operation 1424, the device analyzer 220 de-noises the candidate luma map of the cropped candidate image. This may be performed in a manner similar to that described above with respect to operation 1330.

In operation 1426, the device analyzer 220 subtracts the de-noised candidate luma map from the original candidate luma map prior to de-noising. The resulting candidate luma difference map represents a characteristic noise pattern inserted into the candidate image.

In operation 1428, the device analyzer 220 generates (e.g., computes) a candidate characteristic noise descriptor of the candidate image. This may be performed in a manner similar to that described above with respect operation 1350.

In operation 1430, the device analyzer 220 compares the candidate characteristic noise descriptor of the candidate image to the characteristic noise descriptor of the device 130. This may be performed by calculating an interim pointwise product by pointwise multiplying the candidate luma map to the characteristic noise descriptor of the device 130, computing the Pearson correlation coefficient between the interim pointwise product and the candidate luma difference map, and then comparing the resulting Pearson correlation coefficient to a predetermined threshold correlation coefficient. The threshold correlation coefficient may thus define a boundary (e.g., tipping point) between candidate images that will be deemed to be captured by the camera 330 of the device 130 and candidate images that will be deemed to be captured by some camera other than the camera 330 of the device 130.

In operation 1440, the device analyzer 220 generates a device score based on the comparison performed in operation 1430. For example, this comparison may be a basis for generating the device score discussed above with respect to operation 530 or operation 720.

According to various example embodiments, one or more of the methodologies described herein may facilitate authentication of a request to verify a user (e.g., a person). Moreover, one or more of the methodologies described herein may facilitate interaction between machines (e.g., between the server machine 110 and the device 130) in authenticating such a verification request. Furthermore, these methodologies may be helpful in preparing (e.g., training) and using an executable instance of an artificial intelligence engine (e.g., a neural network) to assist in the authenticating of a request to verify a user. Hence, one or more of the methodologies described herein may facilitate greater precision, accuracy, and efficiency in authenticating user verification requests, as well as provide correspondingly improved access control and data security for computers and networks thereof, compared to capabilities of pre-existing systems and methods.

When these effects are considered in aggregate, one or more of the methodologies described herein may obviate a need for certain efforts or resources that otherwise would be involved in authenticating a request to verify a user. Efforts expended by a user in submitting login credentials and obtaining correspondingly appropriate authorizations may be reduced by use of (e.g., reliance upon) a special-purpose device (e.g., device 130) that implements one or more of the methodologies described herein. Efforts expended by an administrator in processing login credentials, identifying falsified login requests, and providing correspondingly appropriate authorizations may be reduced by use of a special-purpose machine (e.g., server machine 110) that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 15:
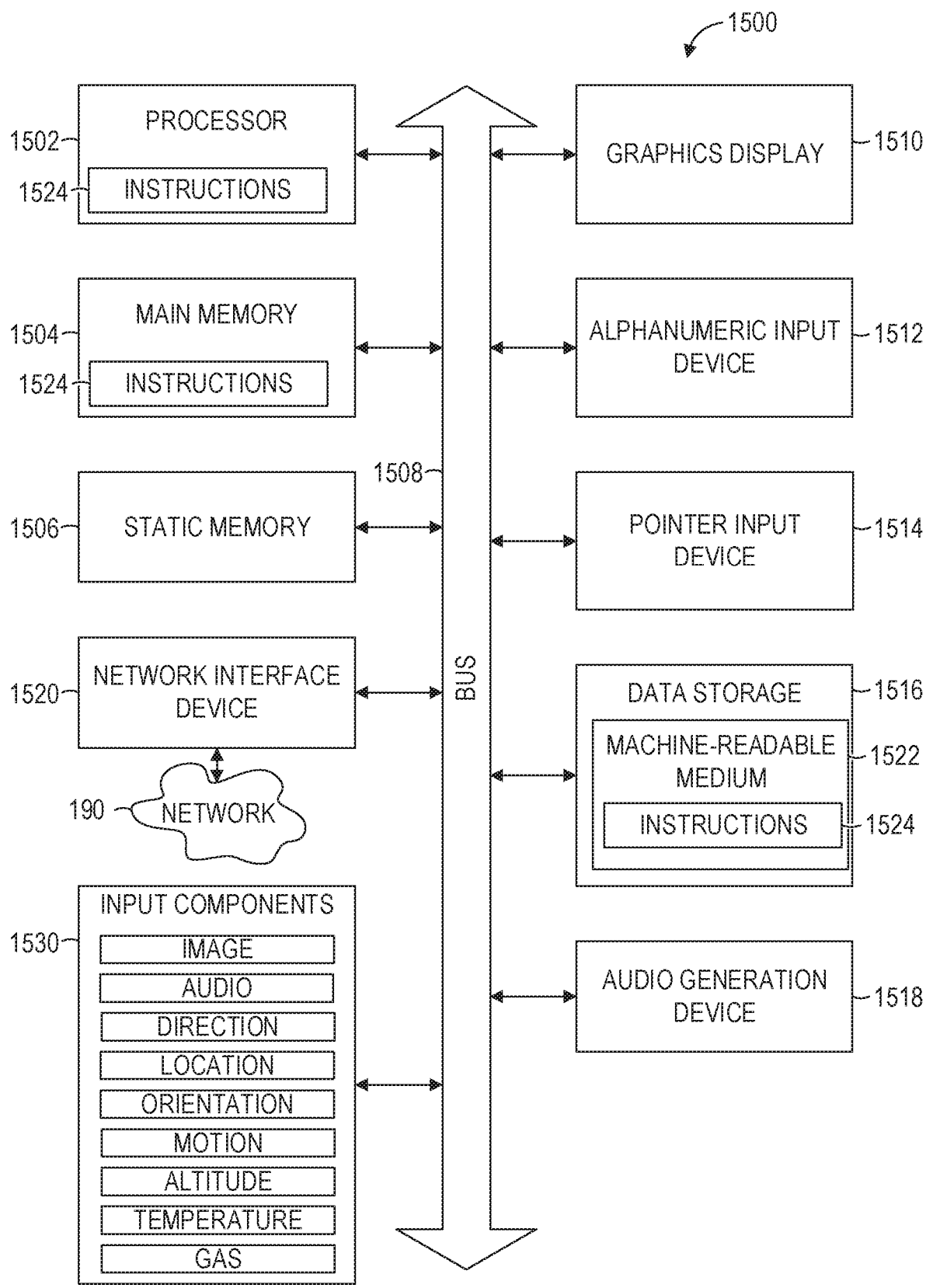
FIG. 15 is a block diagram illustrating components of a machine (e.g., the server machine or the device), according to some example embodiments, able to read instructions from a machine-readable medium and perform any one or more of the methodologies discussed herein.

FIG. 15 is a block diagram illustrating components of a machine 1500, according to some example embodiments, able to read instructions 1524 from a machine-readable medium 1522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1500 in the example form of a computer system (e.g., a computer) within which the instructions 1524 (software, a program, an application, an applet, an app, or other executable code) for causing the machine 1500 to perform any one or more of the methodologies discussed herein may be executed, in whole or in part.

In alternative embodiments, the machine 1500 operates as a standalone device or may be communicatively coupled (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1504, and a static memory 1506, which are configured to communicate with each other via a bus 1508. The processor 1502 contains solid-state digital microcircuits (e.g., electronic, optical, or both) that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein. In some example embodiments, the processor 1502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1500 with at least the processor 1502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a pointer input device 1514 (e.g., a mouse, a touchpad, a touchscreen, a trackball, a joystick, a stylus, a motion sensor, an eye tracking device, a data glove, or other pointing instrument), a data storage 1516, an audio generation device 1518 (e.g., a sound card, an amplifier, a speaker, a headphone jack, or any suitable combination thereof), and a network interface device 1520.

The data storage 1516 (e.g., a data storage device) includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the static memory 1506, within the processor 1502 (e.g., within the processor's cache memory), or any suitable combination thereof, before or during execution thereof by the machine 1500. Accordingly, the main memory 1504, the static memory 1506, and the processor 1502 may be considered machine-readable media tangible and non-transitory machine-readable media). The instructions 1524 may be transmitted or received over the network 190 via the network interface device 1520. For example, the network interface device 1520 may communicate the instructions 1524 using any one or more transfer protocols (e.g., hypertext transfer protocol (HTTP)).

In some example embodiments, the machine 1500 may be a portable computing device (e.g., a smart phone, a tablet computer, or a wearable device), and may have one or more additional input components 1530 (e.g., sensors or gauges). Examples of such input components 1530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1530 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1524 for execution by the machine 1500, such that the instructions 1524, when executed by one or more processors of the machine 1500 (e.g., processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1524 for execution by the machine 1500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1524).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" it a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems machines, devices, or other apparatus) discussed herein.

A first example provides a method comprising:
accessing, by one or more processors of a device, a face image to be submitted in a request to verify a person, the face image being captured by a camera of the device, depicting a face of the person, and including a characteristic noise pattern inserted by the camera into images captured by the camera;
accessing, by one or more processors of the device, geolocation data that represents a geolocation at which the device is located during capture of the face image;
by one or more processors of the device, inputting the face image and the geolocation data into an artificial intelligence engine trained to generate a face score based on the face image, a device score based on the characteristic noise pattern, and a location score based on the geolocation data, the artificial intelligence engine generating the face score, the device score, and the location score in response to the inputting;
obtaining, by one or more processors of the device, an authentication score from a server machine by providing the request with the face score, the device score, and the location score to the server machine via a communication network, the server machine generating the authentication score based on the face score, the device score, and the location score in response to the providing; and
presenting, by one or more processors of the device, an indication that the request to verify the person is authentic based on a comparison of the obtained authentication score to a threshold authentication score.

A second example provides a method according to the first example, wherein:
the characteristic noise pattern inserted by the camera into images captured by the camera indicates a set of manufacturing deviations that occurred during manufacture of the camera. For example, the characteristic noise pattern may indicate the presence of one or more manufacturing errors, flaws, or other defects in the camera.

A third example provides a method according to the first example or the second example, wherein:
the accessing of the face image includes receiving the face image from the camera of the device; and
in response to the face image being received from the camera, the accessing of the geolocation data includes receiving the geolocation data from a geolocation sensor included in the device. Such a situation may occur where the face image is captured live by the camera.

A fourth example provides a method according to any of the first through third examples, wherein:
the accessing the face image includes retrieving the face image from an image library stored by the device; and
in response to the face image being retrieved from the image library, the accessing of the geolocation data includes reading the geolocation data from metadata included in the face image. Such a situation may occur where the face image was previously captured (e.g., by the camera), stored with the metadata in the image library, and retrieved later therefrom.

The fifth example provides a method according to any of the first through fourth examples, wherein:
the artificial intelligence engine trained to generate the face score, the device score, and the location score includes one or more of a deep neural network, a convolutional neural network, or a recurrent neural network.

A sixth example provides a method according to any of the first through fifth examples, wherein:
the server machine generates the authentication score by inputting the face score, the device score, and the location score into a deep beliefs neural network and obtaining the authentication score output therefrom.

A seventh example provides a method according to any of the first through sixth examples, further comprising:

accessing accelerometer data that indicates a movement made by the device during the capture of the face image; and wherein:

the artificial intelligence engine trained to generate the device score is trained to perform a movement analysis of the accelerometer data and generate the device score based on the movement analysis of the accelerometer data; and the device score is generated by the artificial intelligence engine based on the movement analysis of the accelerometer data.

An eighth example provides a method according to any of the first through seventh examples, wherein:

the artificial intelligence engine trained to generate the face score is trained to perform a liveness analysis of the face image and generate the face score based on the liveness analysis of the face image; and the face score is generated by the artificial intelligence engine based on the liveness analysis of the face image.

A ninth example provides a method according to any of the first through eighth examples, wherein:

the artificial intelligence engine trained to generate the location score is trained to perform a background analysis of a background of the face image and generate the location score based on the background analysis; and the location score is generated by the artificial intelligence engine based on the background analysis of the background of the face image.

A tenth example provides a method according to any of the first through ninth examples, wherein:

the artificial intelligence engine trained to generate the location score is trained to perform a metadata analysis of metadata of the face image and generate the location score based on the metadata analysis; and the location score is generated by the artificial intelligence engine based on the metadata analysis of the metadata of the face image.

An eleventh example provides a method comprising:

accessing, by one or more processors of a machine, a face score generated by a first artificial intelligence engine based on a face image submitted in a request to verify a person, the face image being captured by a camera of a device, depicting a face of the person, and including a characteristic noise pattern inserted by the camera into images captured by the camera;

accessing, by one or more processors of the machine, a device score generated by the first artificial intelligence engine based on the characteristic noise pattern in the face image;

accessing, by one or more processors of the machine, a location score generated by the first artificial intelligence engine based on geolocation data that specifies a geolocation at which the device is located during capture of the face image;

generating, by one or more processors of the machine, an authentication score by inputting the face score, the device score, and the location score into a second artificial intelligence engine and obtaining the authentication score output therefrom; and providing, by one or more processors of the machine, the authentication score to the device via a communication network, the providing of the authentication score causing the device to present an indication that the request to verify the person is authentic based on a comparison of the provided authentication score to a threshold authentication score.

A twelfth example provides a method according to the eleventh example, wherein:

the accessing of the face score includes receiving the face image from the device via the communication network, inputting the face image into the first artificial intelligence engine, and receiving the face score output therefrom;

the accessing of the device score includes receiving the device score from the first artificial intelligence engine;

the accessing of the location score includes receiving the geolocation data from the device via the communication network, inputting the geolocation data into the first artificial intelligence engine, and receiving the location score output therefrom. Such a situation may occur where the first artificial intelligence engine is located in a server machine (e.g., server machine 110).

A thirteenth example provides a method according to the eleventh example, wherein:

the accessing of the face score includes receiving the face score from the device via the communication network in response to the device accessing the face image, inputting the face image into the first artificial intelligence engine, and providing the face score output therefrom;

the accessing of the device score includes receiving the device score from the device via the communication network;

the accessing of the location score includes receiving the location score from the device via the communication network in response to the device accessing the geolocation data, inputting the geolocation data into the first artificial intelligence engine, and providing the location score output therefrom. Such a situation may occur where the first artificial intelligence engine is located in a device (e.g., device 130).

A fourteenth example provides a method according to any of the eleventh through thirteenth examples, wherein:

the characteristic noise pattern inserted by the camera into images captured by the camera indicates a set of manufacturing deviations that occurred during manufacture of the camera. For example, the characteristic noise pattern may indicate the presence of one or more manufacturing errors, flaws, or other defects in the camera.

A fifteenth example provides a method according to any of the eleventh through fourteenth examples, wherein:

the first artificial intelligence engine that generates the face score, the device score, and the location score includes one or more of a deep neural network, a convolutional neural network, or a recurrent neural network.

A sixteenth example provides a method according to any of the eleventh through fifteenth examples, wherein:

the second artificial intelligence engine that outputs the authentication score includes a deep beliefs neural network.

A seventeenth example provides a machine-readable medium (e.g., a non-transitory machine-readable storage medium) comprising instructions that, when executed by one or more processors of a device (e.g., device 130), cause the device to perform operations comprising:

accessing a face image to be submitted in a request to verify a person, the face image being captured by a camera of the device, depicting a face of the person, and including a characteristic noise pattern inserted by the camera into images captured by the camera;

accessing geolocation data that represents a geolocation at which the device is located during capture of the face image;

inputting the face image and the geolocation data into an artificial intelligence engine trained to generate a face score based on the face image, a device score based on the characteristic noise pattern, and a location score based on the geolocation data, the artificial intelligence engine generating the face score, the device score, and the location score in response to the inputting;

obtaining an authentication score from a server machine by providing the request with the face score, the device score, and the location score to the server machine via a communication network, the server machine generating the authentication score based on the face score, the device score, and the location score in response to the providing; and presenting an indication that the request to verify the person is authentic based on a comparison of the obtained authentication score to a threshold authentication score.

An eighteenth example provides a machine-readable medium (e.g., a non-transitory machine-readable storage medium) comprising instructions that, when executed by one or more processors of a server machine (e.g., server machine 110), cause the server machine to perform operations comprising:

accessing a face score generated by a first artificial intelligence engine based on a face image submitted in a request to verify a person, the face image being captured by a camera of a device, depicting a face of the person, and including a characteristic noise pattern inserted by the camera into images captured by the camera;

accessing a device score generated by the first artificial intelligence engine based on the characteristic noise pattern in the face image;

accessing a location score generated by the first artificial intelligence engine based on geolocation data that specifies a geolocation at which the device is located during capture of the face image;

generating an authentication score by inputting the face score, the device score, and the location score into a second artificial intelligence engine and obtaining the authentication score output therefrom; and providing the authentication score to the device via a communication network, the providing of the authentication score causing the device to present an indication that the request to verify the person is authentic based on a comparison of the provided authentication score to a threshold authentication score.

A nineteenth example provides a device (e.g., device 130) comprising:

one or more processors; and a memory storing instructions that, when executed by at least one processor among the one or more processors, cause the device to perform operations comprising:

accessing a face image to be submitted in a request to verify a person, the face image being captured by a camera of the device, depicting a face of the person, and including a characteristic noise pattern inserted by the camera into images captured by the camera;

accessing geolocation data that represents a geolocation at which the device is located during capture of the face image;

inputting the face image and the geolocation data into an artificial intelligence engine trained to generate a face score based on the face image, a device score based on the characteristic noise pattern, and a location score based on the geolocation data, the artificial intelligence engine generating the face score, the device score, and the location score in response to the inputting;

obtaining an authentication score from a server machine by providing the request with the face score, the device score, and the location score to the server machine via a communication network, the server machine generating the authentication score based on the face score, the device score, and the location score in response to the providing; and presenting an indication that the request to verify the person is authentic based on a comparison of the obtained authentication score to a threshold authentication score.

A twentieth example provides a server machine (e.g., server machine 110) comprising:

one or more processors; and a memory storing instructions that, when executed by at least one processor among the one or more processors, cause the server machine to perform operations comprising:

accessing a face score generated by a first artificial intelligence engine based on a face image submitted in a request to verify a person, the face image being captured by a camera of a device, depicting a face of the person, and including a characteristic noise pattern inserted by the camera into images captured by the camera;

accessing a device score generated by the first artificial intelligence engine based on the characteristic noise pattern in the face image;

accessing a location score generated by the first artificial intelligence engine based on geolocation data that specifies a geolocation at which the device is located during capture of the face image;

generating an authentication score by inputting the face score, the device score, and the location score into a second artificial intelligence engine and obtaining the authentication score output therefrom; and providing the authentication score to the device via a communication network, the providing of the authentication score causing the device to present an indication that the request to verify the person is authentic based on a comparison of the provided authentication score to a threshold authentication score.

A twenty-first example provides a method comprising:

accessing, by one or more processors of a machine, a reference set of obfuscated geolocations that are generated from and correspond to actual geolocations from which a device submitted requests to verify a person;

grouping, by one or more processors of the machine, the obfuscated geolocations from the reference set into geographical clusters based on a predetermined cluster radius value;

calculating, by one or more processors of the machine, a corresponding representative geolocation for each geographical cluster among the geographical clusters and a corresponding variance distance from the representative geolocation for each geographical cluster among the geographical clusters;

generating, by one or more processors of the machine, a reference location score based on the representative geolocations of the geographical clusters and on the variance distances of the geographical clusters; and training, by one or more processors of the machine, an artificial intelligence engine to output the reference location score in response to the reference set of obfuscated geolocations being input thereto.

A twenty-second example provides a method according to the twenty-first example, wherein:

the reference set of obfuscated geolocations is generated by at least one of quantizing the actual geolocations, adding noise to the actual geolocations, or encrypting the actual geolocations.

A twenty-third example provides a method according to the twenty-first example or the twenty-second example, further comprising:

generating a corresponding weight for each geographical cluster among the geographical clusters based on a corresponding count of obfuscated geolocations in that geographical cluster; and wherein:

the generating of the reference location score is based on the generated weights that correspond to the geographical clusters.

A twenty-fourth example provides a method according to any of the twenty-first through twenty-third examples, wherein:

the calculating of the corresponding representative geolocation for each geographical cluster includes calculating a corresponding mean geolocation for each geographical cluster; and the generating of the reference location score is based on the mean geolocations of the geographical clusters and on the variance distances from the mean geolocations of the geographical clusters.

A twenty-fifth example provides a method according to any of the twenty-first to twenty-fourth examples, further comprising:

calculating a corresponding mean inter-cluster travel distance between successive geolocations in different geographical clusters among the geographical clusters; and wherein:

the generating of the reference location score is based on the mean inter-cluster travel distances.

A twenty-sixth example provides a method according to any of the twenty-first through twenty-fifth examples, further comprising:

calculating a corresponding variance of inter-cluster travel distances between successive geolocations in different geographical clusters among the geographical clusters; and wherein:

the generating of the reference location score is based on the variances of inter-cluster travel distances.

A twenty-seventh example provides a method according to any of the twenty-first through twenty-sixth examples, further comprising:

accessing reference accelerometer data that indicates corresponding movements made by the device; and wherein:

the generating of the reference location score is based on the reference accelerometer data that indicates the corresponding movements made by the device.

A twenty-eighth example provides a method according to any of the twenty-first through twenty-seventh examples, further comprising:

accessing reference compass data that indicates corresponding directions in which the device is oriented; and wherein:

the generating of the reference location score is based on the reference compass data that indicates the corresponding directions in which the device is oriented.

A twenty-ninth example provides a method according to any of the twenty-first through twenty-eighth examples, further comprising:

generating an executable instance of the artificial intelligence engine trained to output the reference location score in response to the reference set of obfuscated geolocations being input thereto; and providing the executable instance of the trained artificial intelligence engine to the device via a communication network, the device being configured to obfuscate an actual geolocation of the device, input the obfuscated geolocation into the executable instance of the artificial intelligence engine, and obtain a corresponding candidate location score output therefrom.

A thirtieth example provides a method comprising:

generating, by one or more processors of a device, an obfuscated geolocation of the device by obfuscating an actual geolocation of the device;

by one or more processors of the device, inputting the obfuscated geolocation of the device into an artificial intelligence engine trained to output a reference location score in response to a reference set of obfuscated geolocations being input thereto, the reference set of obfuscated geolocations being generated from and corresponding to actual geolocations from which the device submitted requests to verify a person, the artificial intelligence engine generating a candidate location score based on the obfuscated geolocation of the device in response to the inputting;

obtaining, by one or more processors of the device, an authentication score from a server machine by providing the candidate location score to the server machine in a request to verify the person, the server machine generating the authentication score based on the candidate location score in response to the providing; and presenting, by one or more processors of the device, an indication that the request to verify the person is authentic based on a comparison of the obtained authentication score to a threshold authentication score.

A thirty-first example provides a method according to the thirtieth example, wherein:

the artificial intelligence engine is trained to output the reference location score based on weights that correspond to geographical clusters generated based on a predetermined cluster radius value, each weight among the weights being generated based on a corresponding count of obfuscated geolocations in the corresponding geographical cluster among the geographical clusters;

the artificial intelligence engine is trained to output the reference location score based on the generated weights that correspond to the geographical clusters; and the artificial intelligence engine generates the candidate location score based on the generated weights that correspond to the geographical clusters.

A thirty-second example provides a method according to the thirtieth example or the thirty-first example, wherein:

the artificial intelligence engine is trained to output the reference location score based on mean inter-cluster travel distances between geographical clusters generated based on a predetermined cluster radius value, each mean inter-cluster travel distance among the mean inter-cluster travel distances being calculated between successive geolocations in different geographical clusters among the geographical clusters; and the artificial intelligence engine generates the candidate location score based on the mean inter-cluster travel distances.

A thirty-third example provides a method according to any of the thirtieth through thirty-second examples, wherein:

the artificial intelligence engine is trained to output the reference location score based on variances of inter-cluster travel distances between geographical clusters generated based on a predetermined cluster radius value, each variance among the variances being calculated based on inter-cluster travel distances between successive geolocations in different geographical clusters among the geographical clusters; and the artificial intelligence engine generates the candidate location score based on the variances of inter-cluster travel distances.

A thirty-fourth example provides a method according to any of the thirtieth through thirty-third examples, wherein:

the artificial intelligence engine is trained to output the reference location score based on comparisons of a maximum travel speed to travel speeds between pairs of successive geolocations, each travel speed among the travel speeds being calculated based on travel distances and travel times between a corresponding pair of successive geolocations; and the artificial intelligence engine generates the candidate location score based on the comparisons of the maximum travel speed to the travel speeds between the pairs of successive geolocations.

A thirty-fifth example provides a method according to any of the thirtieth through thirty-fourth examples, further comprising:

accessing candidate accelerometer data that indicates a corresponding movement made by the device; and wherein:

the artificial intelligence engine is trained to output the reference location score based on reference accelerometer data that indicates corresponding movements made by the device; and the artificial intelligence engine generates the candidate location score based on the candidate accelerometer data that indicates the corresponding movement made by the device.

A thirty-sixth example provides a method according to any of the thirtieth through thirty-fifth examples, further comprising:

accessing candidate compass data that indicates a corresponding direction which the device is oriented; and wherein:

the artificial intelligence engine is trained to output the reference location score based on reference compass data that indicates corresponding directions in which the device is oriented; and the artificial intelligence engine generates the candidate location score based on the candidate compass data that indicates the corresponding direction in which the device is oriented.

A thirty-seventh example provides a machine-readable medium (e.g., a non-transitory machine-readable storage medium) comprising instructions that, when executed by one or more processors of a server machine, cause the server machine to perform operations comprising:

accessing a reference set of obfuscated geolocations that are generated from and correspond to actual geolocations from which a device submitted requests to verify a person;

grouping the obfuscated geolocations from the reference set into geographical clusters based on a predetermined cluster radius value;

calculating a corresponding representative geolocation for each geographical cluster among the geographical clusters and a corresponding variance distance from the representative geolocation for each geographical cluster among the geographical clusters;

generating a reference location score based on the representative geolocations of the geographical clusters and on the variance distances of the geographical clusters; and training an artificial intelligence engine to output the reference location score in response to the reference set of obfuscated geolocations being input thereto.

A thirty-eighth example provides a machine-readable medium (e.g., a non-transitory machine-readable storage medium) comprising instructions that, when executed by one or more processors of a device, cause the device to perform operations comprising:

generating an obfuscated geolocation of the device by obfuscating an actual geolocation of the device;

inputting the obfuscated geolocation of the device into an artificial intelligence engine trained to output a reference location score in response to a reference set of obfuscated geolocations being input thereto, the reference set of obfuscated geolocations being generated from and corresponding to actual geolocations from which the device submitted requests to verify a person, the artificial intelligence engine generating a candidate location score based on the obfuscated geolocation of the device in response to the inputting;

obtaining an authentication score from a server machine by providing the candidate location score to the server machine in a request to verify the person, the server machine generating the authentication score based on the candidate location score in response to the providing; and presenting an indication that the request to verify the person is authentic based on a comparison of the obtained authentication score to a threshold authentication score.

A thirty-ninth example provides a server machine (e.g., server machine 110) comprising:

one or more processors; and a memory storing instructions that, when executed by at least one processor among the one or more processors, cause the server machine to perform operations comprising:

accessing a reference set of obfuscated geolocations that are generated from and correspond to actual geolocations from which a device submitted requests to verify a person;

grouping the obfuscated geolocations from the reference set into geographical clusters based on a predetermined cluster radius value;

calculating a corresponding representative geolocation for each geographical cluster among the geographical clusters and a corresponding variance distance from the representative geolocation for each geographical cluster among the geographical clusters;

generating a reference location score based on the representative geolocations of the geographical clusters and on the variance distances of the geographical clusters; and training an artificial intelligence engine to output the reference location score in response to the reference set of obfuscated geolocations being input thereto.

A fortieth example provides a device (e.g., device 130) comprising:

one or more processors; and a memory storing instructions that, when executed by at least one processor among the one or more processors, cause the device to perform operations comprising:

generating an obfuscated geolocation of the device by obfuscating an actual geolocation of the device;

inputting the obfuscated geolocation of the device into an artificial intelligence engine trained to output a reference location score in response to a reference set of obfuscated geolocations being input thereto, the reference set of obfuscated geolocations being generated from and corresponding to actual geolocations from which the device submitted requests to verify a person, the artificial intelligence engine generating a candidate location score based on the obfuscated geolocation of the device in response to the inputting;

obtaining an authentication score from a server machine by providing the candidate location score to the server machine in a request to verify the person, the server machine generating the authentication score based on the candidate location score in response to the providing; and presenting an indication that the request to verify the person is authentic based on a comparison of the obtained authentication score to a threshold authentication score.

A forty-first example provides a carrier medium carrying machine-readable instructions for controlling a machine to carry out the operations (e.g., method operations) performed in any one of the previously described examples.

What is claimed is:

1. A method comprising:
accessing, by one or more processors of a device, a face image to be submitted in a request to verify a person, the face image being captured by a camera of the device, depicting a face of the person, and including a characteristic noise pattern inserted by the camera into images captured by the camera;
accessing, by one or more processors of the device, geolocation data that represents a geolocation at which the device is located during capture of the face image;
by one or more processors of the device, inputting the face image and the geolocation data into an artificial intelligence engine trained to generate a face score based on the face image, a device score based on the characteristic noise pattern, and a location score based on the geolocation data, the artificial intelligence engine generating the face score, the device score, and the location score in response to the inputting;
obtaining, by one or more processors of the device, an authentication score from a server machine by providing the request with the face score, the device score, and the location score to the server machine via a communication network, the server machine generating the authentication score based on the face score, the device score, and the location score in response to the providing; and
presenting, by one or more processors of the device, an indication that the request to verify the person is authentic based on a comparison of the obtained authentication score to a threshold authentication score.

2. The method of claim 1, wherein:
the characteristic noise pattern inserted by the camera into images captured by the camera indicates a set of manufacturing deviations that occurred during manufacture of the camera.

3. The method of claim 1, wherein:
the accessing of the face image includes receiving the face image from the camera of the device; and
in response to the face image being received from the camera, the accessing of the geolocation data includes receiving the geolocation data from a geolocation sensor included in the device.

4. The method of claim 1, wherein:
the accessing the face image includes retrieving the face image from an image library stored by the device; and
in response to the face image being retrieved from the image library, the accessing of the geolocation data includes reading the geolocation data from metadata included in the face image.

5. The method of claim 1, wherein:
the artificial intelligence engine trained to generate the face score, the device score, and the location score includes one or more of a deep neural network, a convolutional neural network, or a recurrent neural network.

6. The method of claim 1, wherein:
the server machine generates the authentication score by inputting the face score, the device score, and the location score into a deep beliefs neural network and obtaining the authentication score output therefrom.

7. The method of claim 1, further comprising:
accessing accelerometer data that indicates a movement made by the device during the capture of the face image; and wherein:
the artificial intelligence engine trained to generate the device score is trained to perform a movement analysis of the accelerometer data and generate the device score based on the movement analysis of the accelerometer data; and
the device score is generated by the artificial intelligence engine based on the movement analysis of the accelerometer data.

8. The method of claim 1, wherein:
the artificial intelligence engine trained to generate the face score is trained to perform a liveness analysis of the face image and generate the face score based on the liveness analysis of the face image; and
the face score is generated by the artificial intelligence engine based on the liveness analysis of the face image.

9. The method of claim 1, wherein:
the artificial intelligence engine trained to generate the location score is trained to perform a background analysis of a background of the face image and generate the location score based on the background analysis; and
the location score is generated by the artificial intelligence engine based on the background analysis of the background of the face image.

10. The method of claim 1, wherein:
the artificial intelligence engine trained to generate the location score is trained to perform a metadata analysis of metadata of the face image and generate the location score based on the metadata analysis; and
the location score is generated by the artificial intelligence engine based on the metadata analysis of the metadata of the face image.

11. A method comprising:
accessing, by one or more processors of a machine, a face score generated by a first artificial intelligence engine based on a face image submitted in a request to verify a person, the face image being captured by a camera of a device, depicting a face of the person, and including a characteristic noise pattern inserted by the camera into images captured by the camera;
accessing, by one or more processors of the machine, a device score generated by the first artificial intelligence engine based on the characteristic noise pattern in the face image;
accessing, by one or more processors of the machine, a location score generated by the first artificial intelligence engine based on geolocation data that specifies a geolocation at which the device is located during capture of the face image;

generating, by one or more processors of the machine, an authentication score by inputting the face score, the device score, and the location score into a second artificial intelligence engine and obtaining the authentication score output therefrom; and providing, by one or more processors of the machine, the authentication score to the device via a communication network, the providing of the authentication score causing the device to present an indication that the request to verify the person is authentic based on a comparison of the provided authentication score to a threshold authentication score.

12. The method of claim 11, wherein:

the accessing of the face score includes receiving the face image from the device via the communication network, inputting the face image into the first artificial intelligence engine, and receiving the face score output therefrom;

the accessing of the device score includes receiving the device score from the first artificial intelligence engine;

the accessing of the location score includes receiving the geolocation data from the device via the communication network, inputting the geolocation data into the first artificial intelligence engine, and receiving the location score output therefrom.

13. The method of claim 11, wherein:

the accessing of the face score includes receiving the face score from the device via the communication network in response to the device accessing the face image, inputting the face image into the first artificial intelligence engine, and providing the face score output therefrom;

the accessing of the device score includes receiving the device score from the device via the communication network;

the accessing of the location score includes receiving the location score from the device via the communication network in response to the device accessing the geolocation data, inputting the geolocation data into the first artificial intelligence engine, and providing the location score output therefrom.

14. The method of claim 11, wherein:

the characteristic noise pattern inserted by the camera into images captured by the camera indicates a set of manufacturing deviations that occurred during manufacture of the camera.

15. The method of claim 11, wherein:

the first artificial intelligence engine that generates the face score, the device score, and the location score includes one or more of a deep neural network, a convolutional neural network, or a recurrent neural network.

16. The method of claim 11, wherein:

the second artificial intelligence engine that outputs the authentication score includes a deep beliefs neural network.

17. A non-transitory machine-readable storage medium comprising instructions that, when executed by one or more processors of a device, cause the device to perform operations comprising:

accessing a face image to be submitted in a request to verify a person, the face image being captured by a camera of the device, depicting a face of the person, and including a characteristic noise pattern inserted by the camera into images captured by the camera;

accessing geolocation data that represents a geolocation at which the device is located during capture of the face image;

inputting the face image and the geolocation data into an artificial intelligence engine trained to generate a face score based on the face image, a device score based on the characteristic noise pattern, and a location score based on the geolocation data, the artificial intelligence engine generating the face score, the device score, and the location score in response to the inputting;

obtaining an authentication score from a server machine by providing the request with the face score, the device score, and the location score to the server machine via a communication network, the server machine generating the authentication score based on the face score, the device score, and the location score in response to the providing; and presenting an indication that the request to verify the person is authentic based on a comparison of the obtained authentication score to a threshold authentication score.

18. A non-transitory machine-readable storage medium comprising instructions that, when executed by one or more processors of a server machine, cause the server machine to perform operations comprising:

accessing a face score generated by a first artificial intelligence engine based on a face image submitted in a request to verify a person, the face image being captured by a camera of a device, depicting a face of the person, and including a characteristic noise pattern inserted by the camera into images captured by the camera;

accessing a device score generated by the first artificial intelligence engine based on the characteristic noise pattern in the face image;

accessing a location score generated by the first artificial intelligence engine based on geolocation data that specifies a geolocation at which the device is located during capture of the face image;

generating an authentication score by inputting the face score, the device score, and the location score into a second artificial intelligence engine and obtaining the authentication score output therefrom; and providing the authentication score to the device via a communication network, the providing of the authentication score causing the device to present an indication that the request to verify the person is authentic based on a comparison of the provided authentication score to a threshold authentication score.

19. A device comprising:

one or more processors; and a memory storing instructions that, when executed by at least one processor among the one or more processors, cause the device to perform operations comprising:

accessing a face image to be submitted in a request to verify a person, the face image being captured by a camera of the device, depicting a face of the person, and including a characteristic noise pattern inserted by the camera into images captured by the camera;

accessing geolocation data that represents a geolocation at which the device is located during capture of the face image;

inputting the face image and the geolocation data into an artificial intelligence engine trained to generate a face score based on the face image, a device score based on the characteristic noise pattern, and a location score based on the g ° location data, the artificial intelligence engine generating the face score, the device score, and the location score in response to the inputting;

obtaining an authentication score from a server machine by providing the request with the face score, the device score, and the location score to the server machine via a communication network, the server machine generating the authentication score based on the face score, the device score, and the location score in response to the providing; and presenting an indication that the request to verify the person is authentic based on a comparison of the obtained authentication score to a threshold authentication score.

20. A server machine comprising:

one or more processors; and a memory storing instructions that, when executed by at least one processor among the one or more processors, cause the server machine to perform operations comprising:

accessing a face score generated by a first artificial intelligence engine based on a face image submitted in a request to verify a person, the face image being captured by a camera of a device, depicting a face of the person, and including a characteristic noise pattern inserted by the camera into images captured by the camera;

accessing a device score generated by the first artificial intelligence engine based on the characteristic noise pattern in the face image;

accessing a location score generated by the first artificial intelligence engine based on geolocation data that specifies a geolocation at which the device is located during capture of the face image;

generating an authentication score by inputting the face score, the device score, and the location score into a second artificial intelligence engine and obtaining the authentication score output therefrom; and providing the authentication score to the device via a communication network, the providing of the authentication score causing the device to present an indication that the request to verify the person is authentic based on a comparison of the provided authentication score to a threshold authentication score.

\* \* \* \* \*

UNITED STATES PATENT AND TRADEMARK OFFICE
CERTIFICATE OF CORRECTION

Page 1 of 2

PATENT NO. : 10,740,448 B2
APPLICATION NO. : 16/019321
DATED : August 11, 2020
INVENTOR(S) : Conde et al.

It is certified that error appears in the above-identified patent and that said Letters Patent is hereby corrected as shown below:

On the Title Page

In item (57), in "Abstract", in Column 2, Line 1, after "request to", insert --verify a--

In item (57), in "Abstract", in Column 2, Line 4, after "geolocation", insert --at--

In item (57), in "Abstract", in Column 2, Line 5, delete "puts" and insert --inputs-- therefor In item (57), in "Abstract", in Column 2, Line 7, before "device", insert --a--

In the Specification

In Column 1, Line 63, delete "f" and insert --of-- therefor

In Column 2, Line 2, after "device", insert --)--

In Column 5, Line 42, delete "an" and insert --any-- therefor

In Column 7, Line 38, delete "operable," and insert --operable-- therefor

In Column 9, Line 53, after "data", insert --(e.g.,--

In Column 11, Line 5, after "person", insert --(e.g., the--

In Column 12, Line 8, after "130", insert --(e.g.,--

In Column 12, Line 12, delete "e.g.," and insert --(e.g.,-- therefor

In Column 12, Line 15, after "270", insert --(e.g.,--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,740,448 B2

In Column 12, Line 56, after "score,", insert --the--

In Column 12, Line 60, after "540", insert --.--

In Column 14, Line 28, after "images", insert --(e.g.,--

In Column 14, Line 45, delete "duster" and insert --cluster-- therefor

In Column 19, Line 56, delete "rioted" and insert --noted-- therefor

In Column 21, Line 26, delete "(software," and insert --(e.g., software,-- therefor In Column 22, Line 36, after "media", insert --(e.g.,--

In Column 25, Line 35, delete "it" and insert --is-- therefor

In Column 25, Line 66, after "systems", insert --(e.g.,--

In Column 33, Line 43, after "direction", insert --in--

In the Claims

In Column 39, Line 2, in Claim 19, delete "g ° location" and insert --geolocation-- therefor